Aug. 30, 1955 E. A. WAHL ET AL 2,716,497
APPARATUS FOR HANDLING MATERIALS
Filed Dec. 9, 1953 17 Sheets-Sheet 1
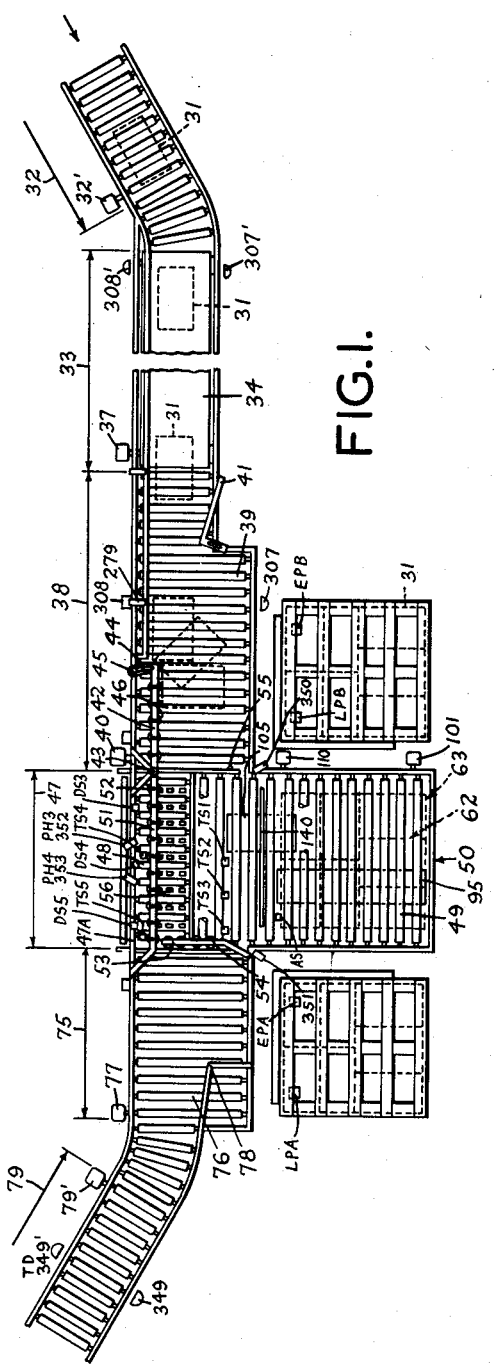
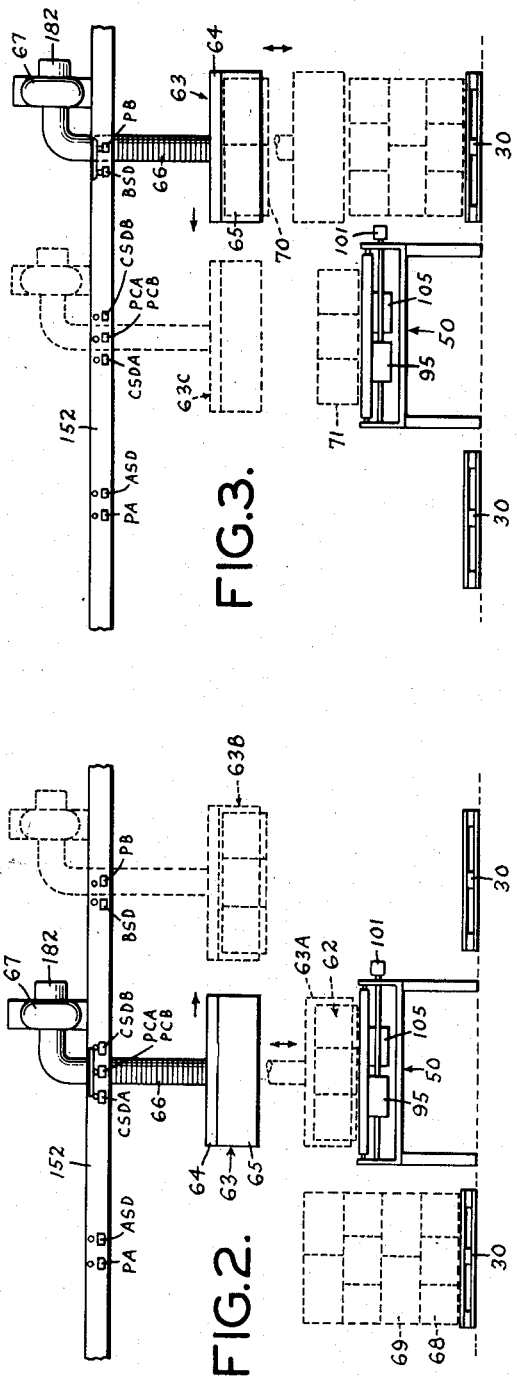
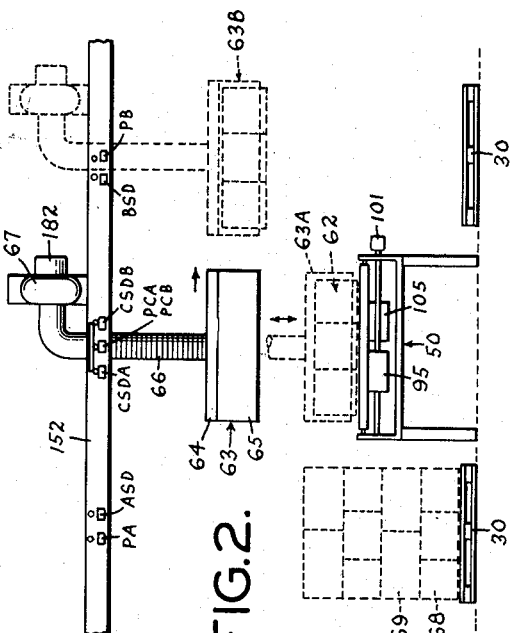

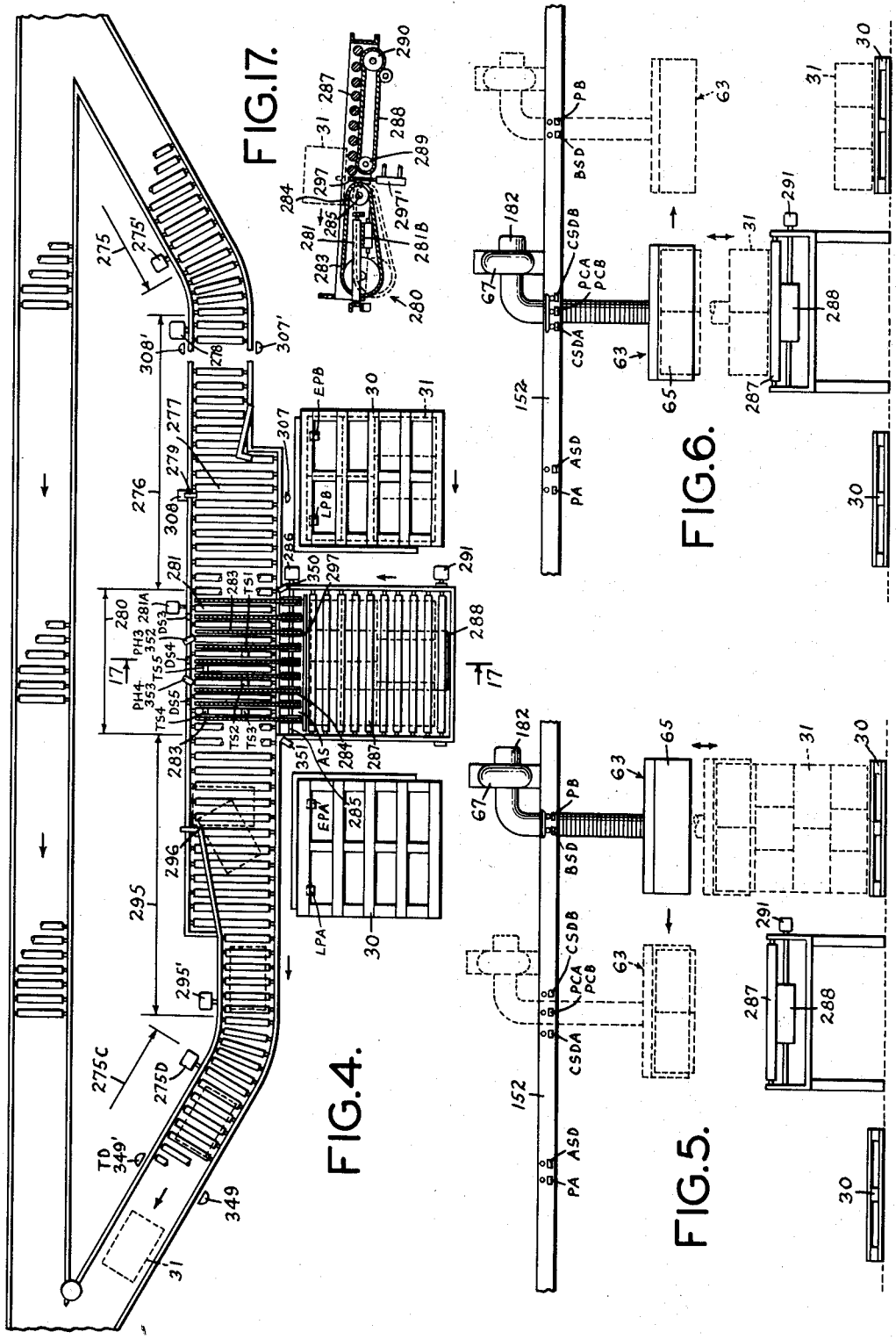

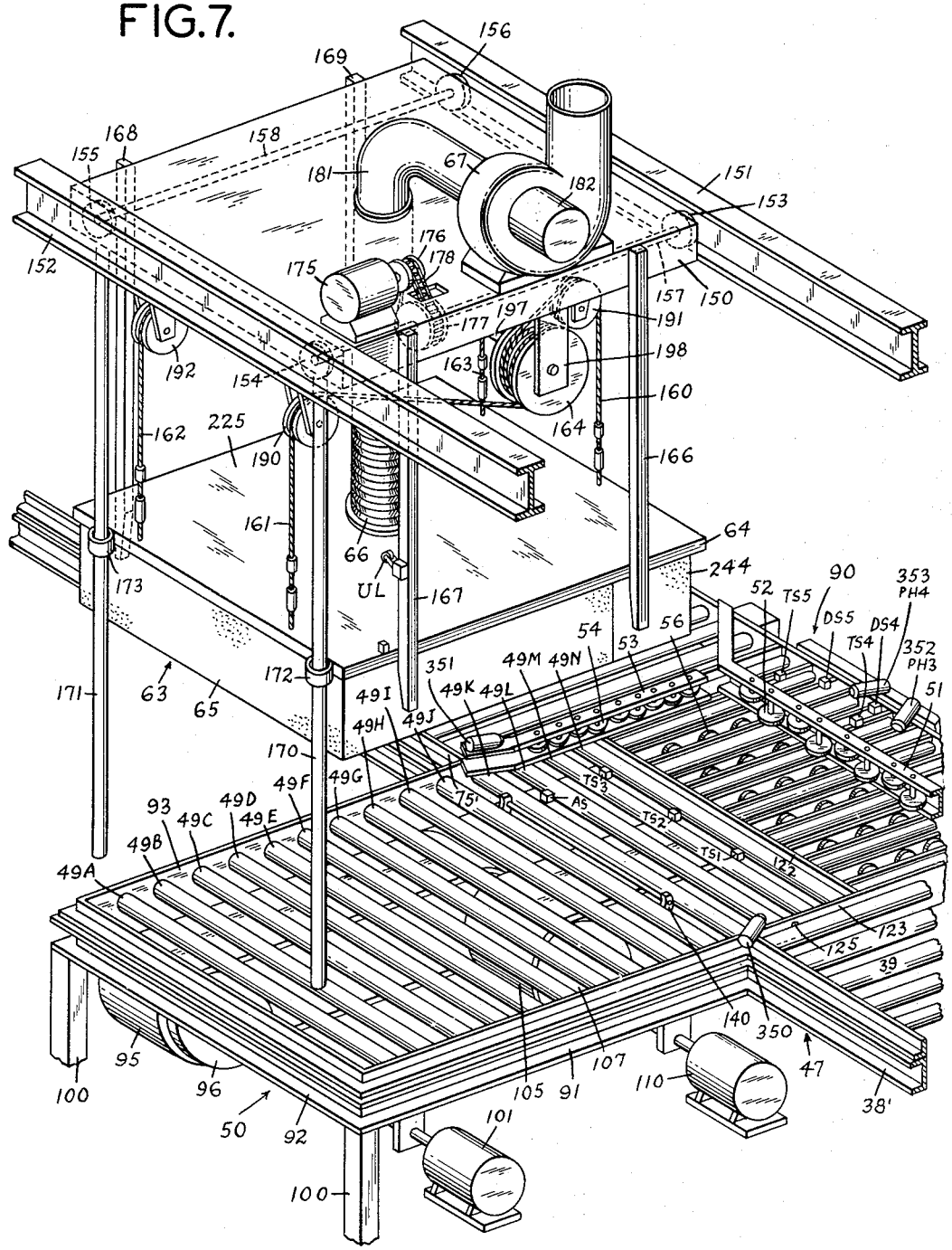

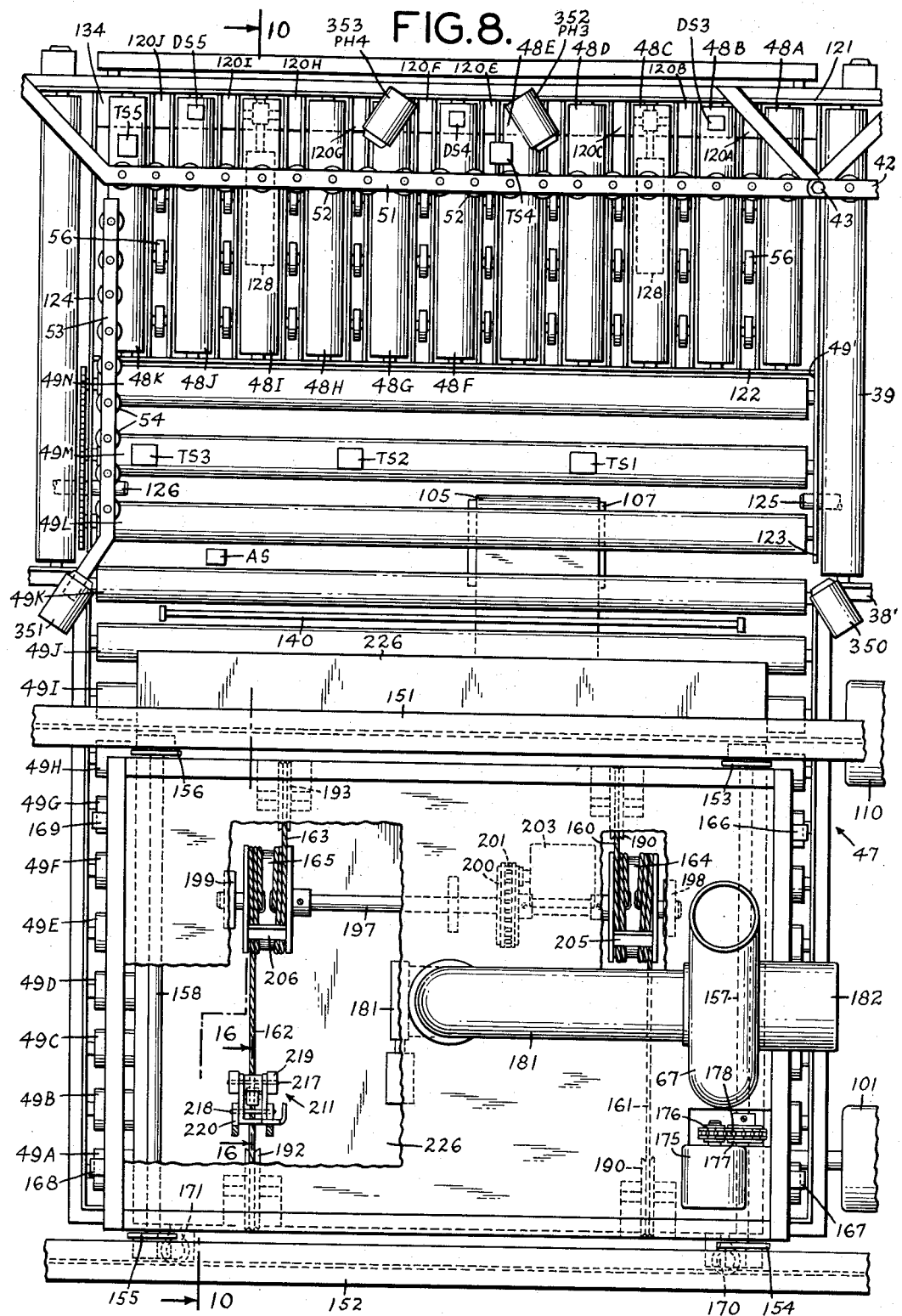

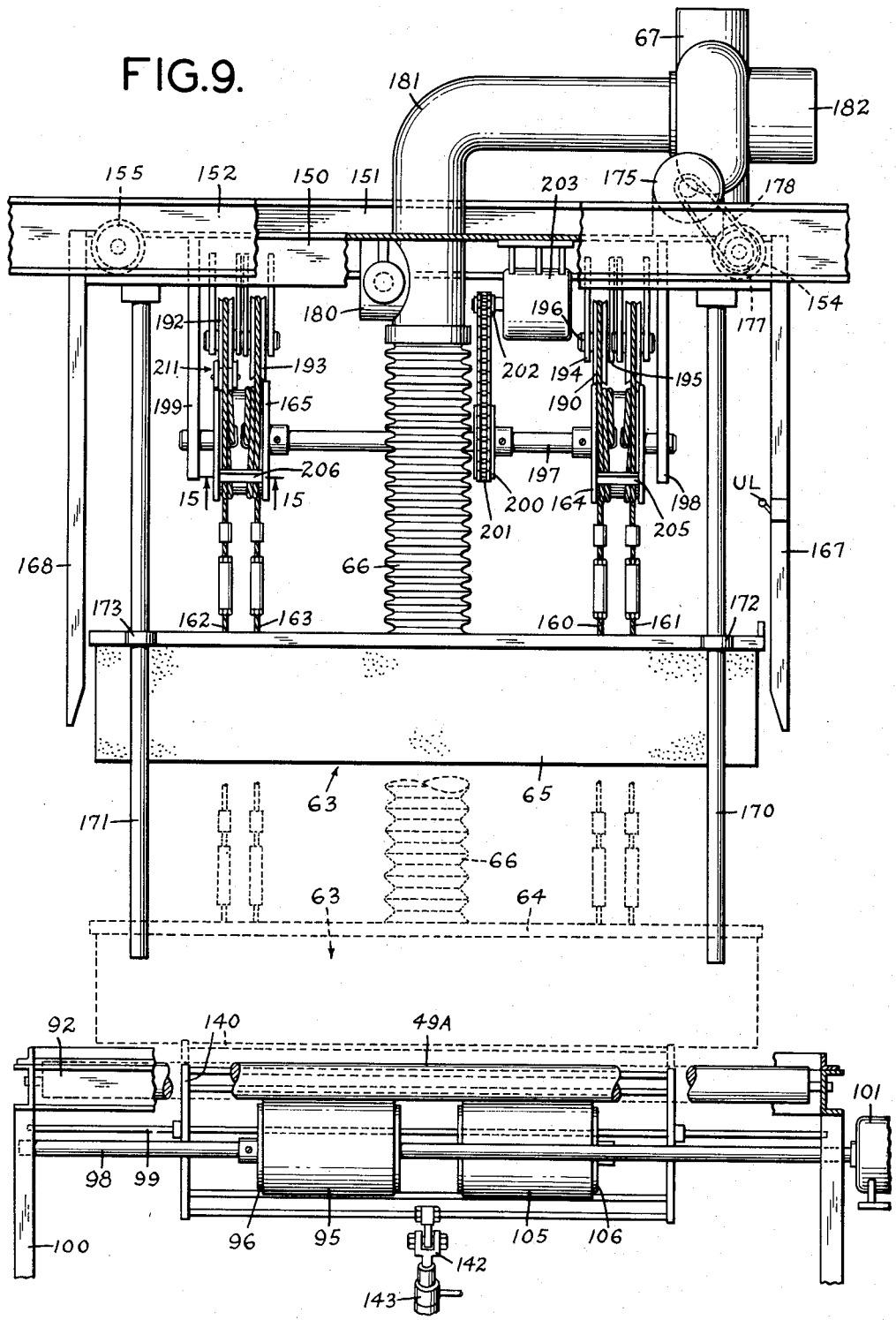

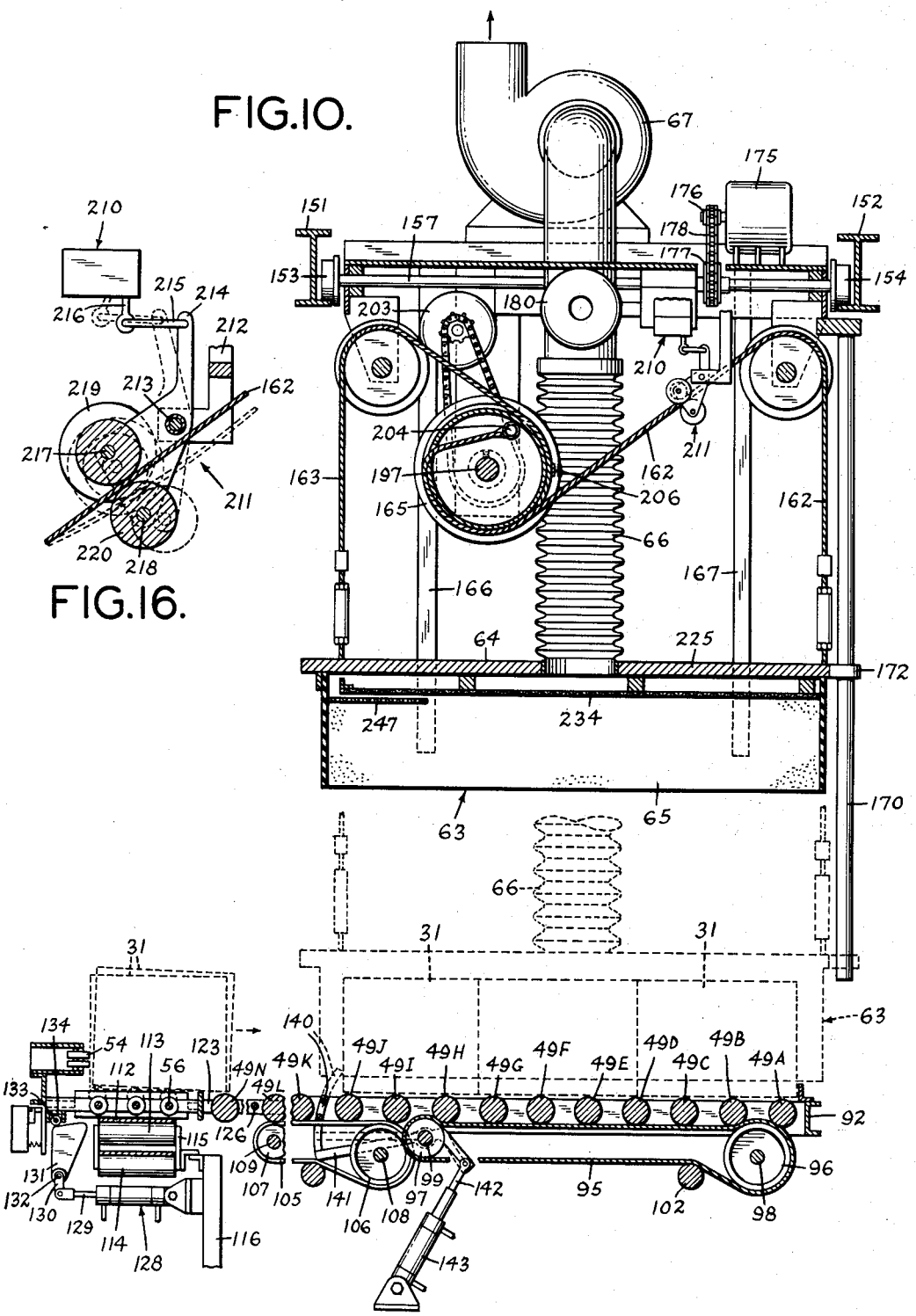

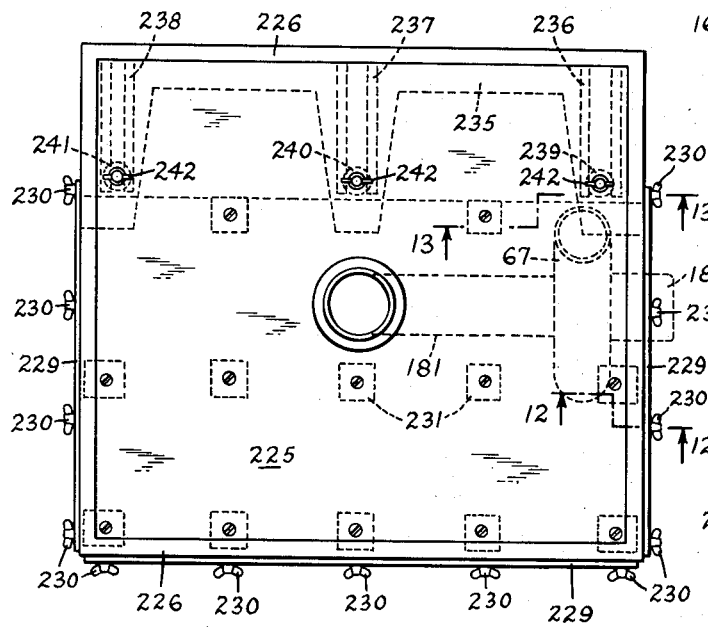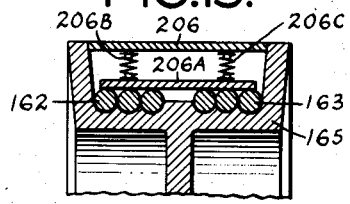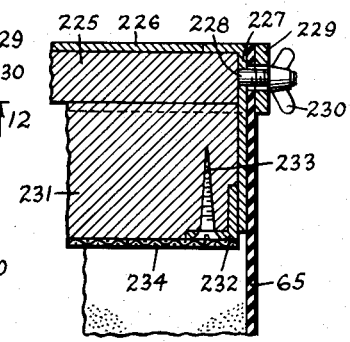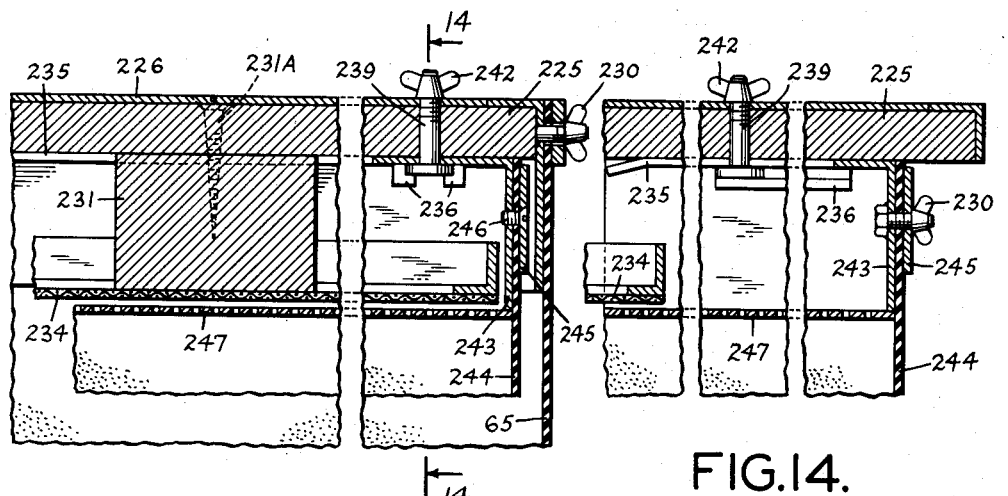

Aug. 30, 1955 — E. A. WAHL ET AL — 2,716,497
APPARATUS FOR HANDLING MATERIALS
Filed Dec. 9, 1953
FIG.18A.
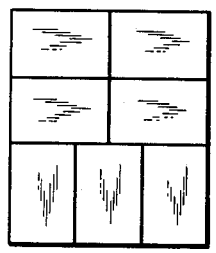
FIG.19A.
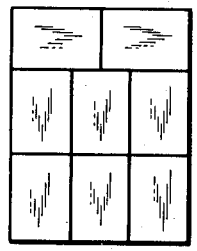
FIG.18B.
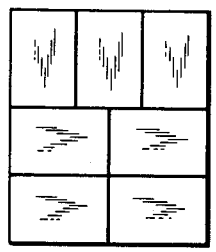
FIG.19B.
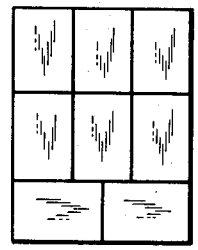
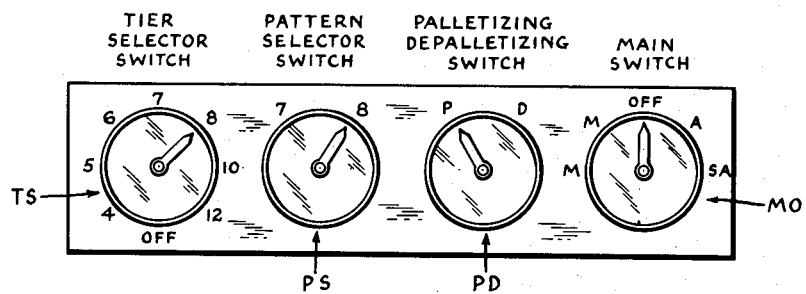
FIG.20A.

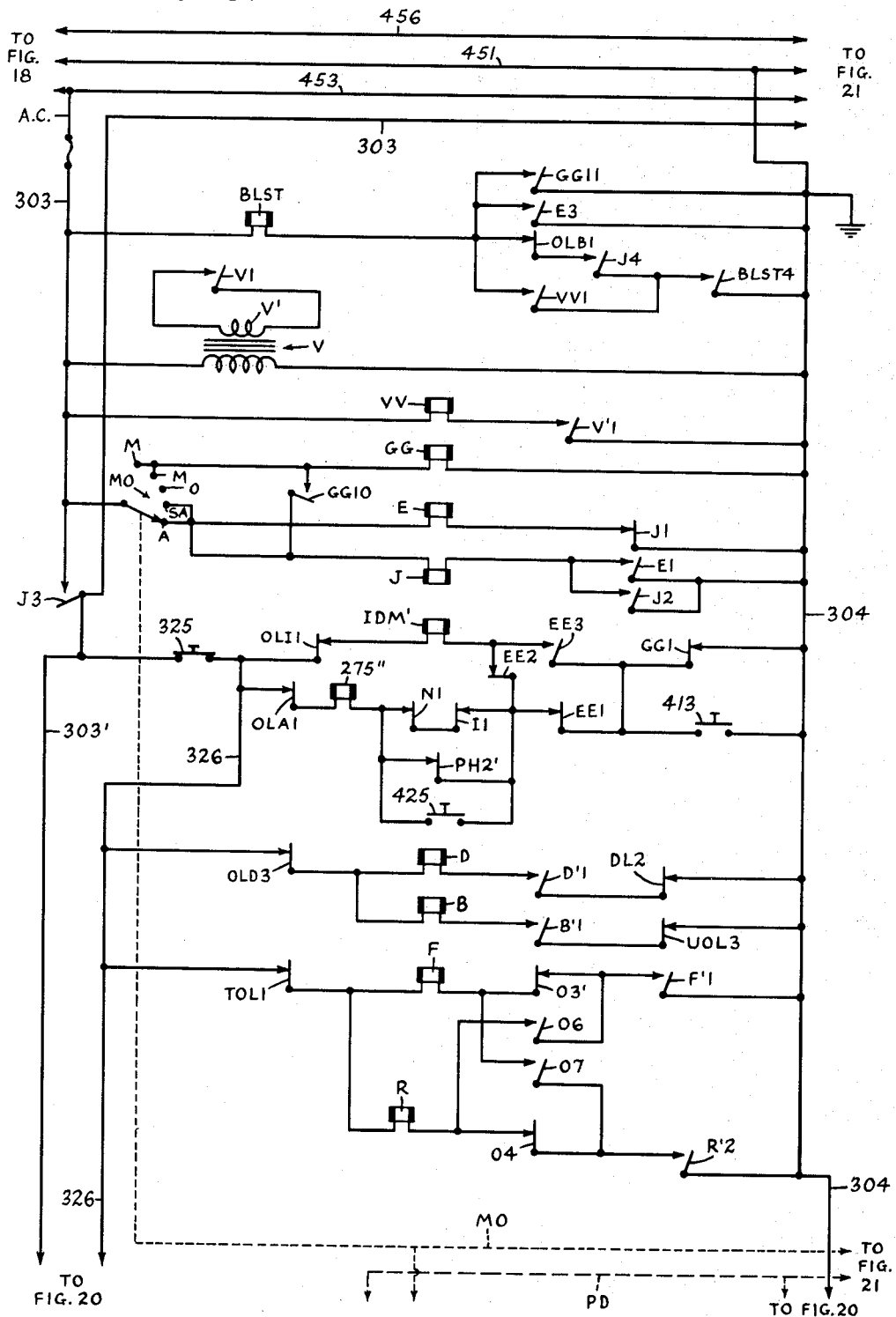

Aug. 30, 1955    E. A. WAHL ET AL    2,716,497
APPARATUS FOR HANDLING MATERIALS
Filed Dec. 9, 1953    17 Sheets-Sheet 14

Aug. 30, 1955

E. A. WAHL ET AL 2,716,497

APPARATUS FOR HANDLING MATERIALS

Filed Dec. 9, 1953

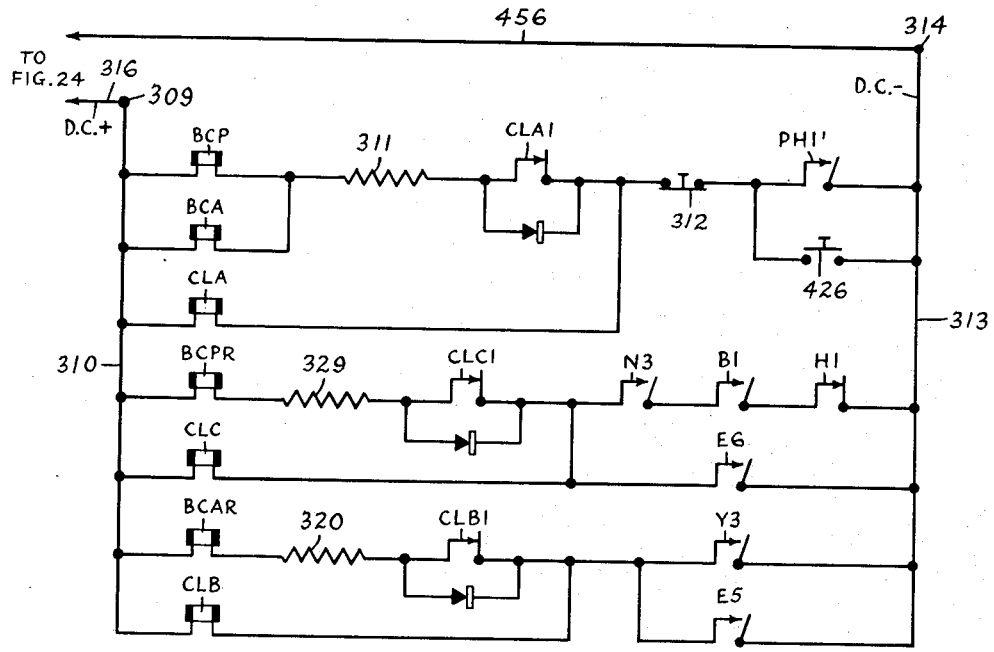

United States Patent Office 2,716,497
Patented Aug. 30, 1955

2,716,497
APPARATUS FOR HANDLING MATERIALS

Eugene A. Wahl, Glen Ridge, and Ralph J. Winters, Nutley, N. J., assignors to P. Ballantine & Sons, Newark, N. J., a corporation of New Jersey Application December 9, 1953, Serial No. 397,855

8 Claims. (Cl. 214—6)

The present invention relates to the handling of relatively heavy packages and more particularly to a method and apparatus for loading and unloading cartons or other parcels onto or from a portable lift truck platform.

The use of pallets, skids or like portable platforms adapted to support cartons or other parcels or objects placed thereon in patterned layers or tiers has been found to greatly facilitate the shipping and storage of many types of goods. When the layers or tiers have been properly formed on such platforms, the platforms may readily be picked up and carried from one point to another by a lift truck.

The cartons or other units to be placed in patterned relationship on the platforms to form the tiers are frequently transported to the loading point by means of a conveyor system. However, at the loading point, it is necessary to place the cartons or other units on the portable platforms in the desired patterns. This operation has generally been time consuming and has required considerable labor. Similar disadvantages occur with respect to unloading the platforms when it is desired to place the individual cartons or objects on a conveyor system or to otherwise dispose of them as individual units.

Various means have heretofore been suggested for mechanizing the platform loading and unloading operations. In general, these various means have been unsatisfactory for one reason or another. Frequently these machines proposed have been too complicated and expensive for efficient use in a small or medium size plant or warehouse. Another disadvantage has resided in the difficulty encountered, or complication involved, in readjusting a machine which has been handling cartons or other objects of one size and shape to adapt the same to load or unload cartons of a different size or shape. Similarly, where machines are needed for both unloading and loading, considerable rearrangement and readjustment of parts has usually been involved in changing from the loading operation to the unloading operation.

Another important consideration in machines of this character, particularly where bottled or other fragile goods are being handled, resides in the safety and reliability of the operation, because dropping of a load, in the course of forming and transporting groups of cartons, frequently results in a considerable loss in time and in destruction of the goods.

A principal object of the invention has been to provide novel and improved apparatus for loading and unloading patterned layers or tiers of cartons or other objects onto or from a portable platform, which overcomes the various objections found in the use of apparatus previously employed for the purpose.

More particularly, it has been an object of the invention to provide relatively inexpensive, reliable and efficient apparatus of the above type.

Another object of the invention has been to provide apparatus of the character indicated adapted to cooperate with a conveyor system in the loading or unloading of cartons, boxes or other objects.

Still another object of the invention has been to provide apparatus of the above indicated type which is adapted to handle cartons or other objects of different sizes, without adjustment or with a minimum of adjustment.

A further object of the invention has been to provide apparatus of the character indicated, which is adapted to cooperate with a conveyor system in the loading or unloading of cartons or other objects and which operates automatically in forming patterned layers or tiers from individual units on the conveyor, or breaking up patterned layers or tiers for delivery to the conveyor in individual units.

Another object of the invention has been to provide a novel and improved method of forming patterned layers or tiers of cartons or other objects on a portable platform from individual objects delivered on a conveyor system.

An important feature of the invention has been the provision of a novel and improved suction head for safely and efficiently seizing, raising and carrying a patterned layer or tier of cartons or other objects.

Other and further objects, features and advantages of the invention will appear more clearly from the following description of the invention.

The invention will now be described in greater detail with reference to the appended drawings in which:

Fig. 1 is a schematic plan view of one form of apparatus, in accordance with the invention, for forming patterned tiers of boxes, cartons or the like on portable platforms or pallets, the apparatus being reversible for breaking up such tiers into individual units and delivering such units to one or more points;

Fig. 2 is a schematic elevational view of a portion of the apparatus of Fig. 1, illustrating one stage of the loading or palletizing operation;

Fig. 3 is a view similar to Fig. 2, but showing the apparatus at another stage of the loading or palletizing operation;

Fig. 4 is a view similar to Fig. 1 illustrating another form of apparatus, in accordance with the invention, for forming patterned tiers of boxes, cartons or the like on portable platforms or pallets, and usable also for breaking up such tiers into individual units and delivering such units to one or more points;

Fig. 5 is a schematic elevational view of a portion of the apparatus of Fig. 4, showing the position of parts at one stage of an unloading or depalletizing operation;

Fig. 6 is a view similar to Fig. 5 and illustrates the position of the parts at another stage of the unloading or depalletizing operation;

Fig. 7 is a perspective view illustrating one form of apparatus, in accordance with the invention, for forming, lifting and conveying layers of cartons, boxes or the like;

Fig. 8 is a plan view of the apparatus of Fig. 7 with portions broken away to illustrate certain constructional details;

Fig. 9 is a front elevational view of the apparatus shown in Fig. 7;

Fig. 10 is a cross-sectional view taken along the line 10—10 of Fig. 8;

Fig. 11 is a detailed view, in plan, of the suction head of the apparatus illustrated in Fig. 7;

Fig. 12 is an enlarged sectional view taken along the line 12—12 of Fig. 11;

Fig. 13 is an enlarged sectional view taken along the line 13—13 of Fig. 11;

Fig. 14 is a sectional view taken along the line 14—14 of Fig. 13;

Fig. 15 is an enlarged sectional view taken along the line 15—15 of Fig. 9;

Fig. 16 is an enlarged sectional view taken along the line 16—16 of Fig. 8 and shows a slack cable switch operating mechanism;

Fig. 17 is a sectional view taken along the line 17—17 of Fig. 4;

Figs. 18, 19, 20, 21, 22, 23, 24, 25 and 26 illustrate a circuit arrangement for providing automatic, semi-automatic, or manual control of the palletizing and depalletizing operations;

Figs. 18A and 18B illustrate typical carton arrangements for 7 carton tiers;

Figs. 19A and 19B illustrate typical carton arrangements for 8 carton tiers;

Fig. 20A is an elevational view illustrating the principal switches to be pre-set for fully automatic operation; and Fig. 27 illustrates the relative disposition of Figs. 18–26 to show the circuit diagram.

Figure 18:
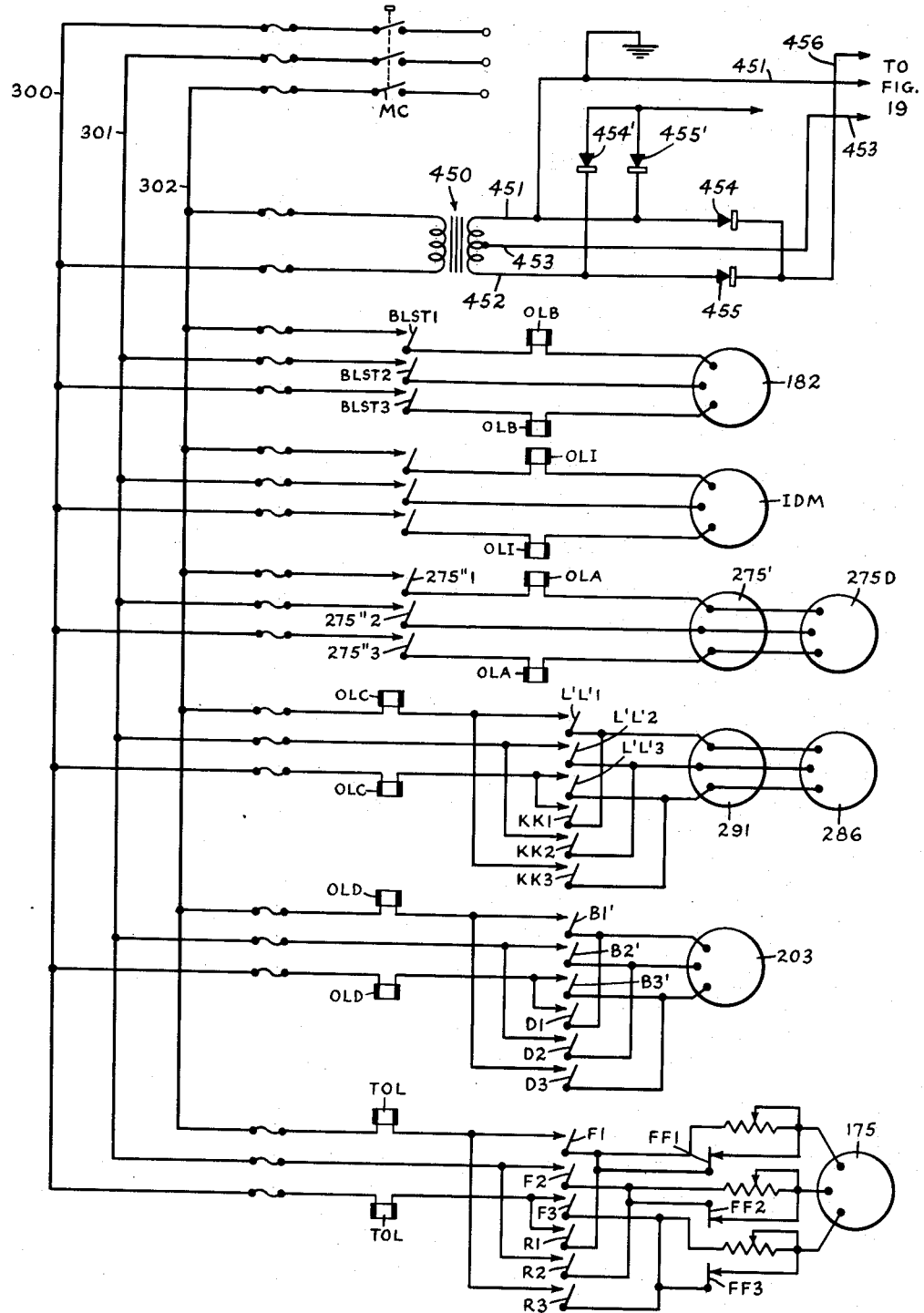

Referring now to the drawings and more particularly to Figs. 1 to 3 thereof, there is illustrated apparatus for selectively loading or unloading portable platforms such as the pallets 30. The loading operation will be described first. Cartons 31 are fed one after another along a powered roller or other suitable conveyor section 32 to an accumulator conveyor section 33 which comprises an endless belt 34 carried on rollers 35 and 36 and driven by an electric motor 37. The belt 34 preferably travels at a relatively slow speed such as, for example, about 40 feet per minute, which is somewhat less than the conveying speed of the section 32, so as to accumulate on the belt 34 a row of cartons closely spaced end to end. Cartons from the belt 34 are delivered to a conveyor section 38 comprising a series of transverse powered rollers 39 suitably connected by chain and sprocket means, or the like, to an operating motor 40. The rollers 39 are preferably operated at such a speed as to carry the cartons 31 at a substantially higher rate than they are carried by the belt 34. This difference in speed provides adequate room for turning selected ones of the cartons on the section 38, as will be described later. An adjustable guide member 41 is provided adjacent the path of advance of the cartons 31 and near the start of the conveyor section 38 in order to cause all advancing cartons to proceed along substantially the same path. As shown, the inner face of the guide member is inclined to the path of movement of the cartons and is arranged to cam or push the cartons toward a guide rail at the opposite side of the conveyor section as the cartons are advanced.

To provide for proper stability, the tiers or layers in which the cartons are stacked on the pallets 30 should have particular configurations dependent primarily upon the size of the cartons. The configurations, which are generally termed "patterns," are usually selected after experience in handling the loaded pallets. The pallets 30 of Fig. 1 are shown with a seven-carton tier in which three cartons are provided side by side lengthwise and four cartons in groups of two transversely. The next higher tier preferably has the pattern reversed, as will be seen by examining the loaded pallets of Figs. 2 and 3. In order to form the patterns of a tier, some of the cartons to be included therein must be turned from the end-to-end relationship in which they advance along the conveyor sections 32 and 33 to a transverse side-by-side relationship. For this purpose, there is provided a manually operated turning member or bar 42 adapter to extend into the path of advance of the cartons 34 at a suitable point along the conveyor section 38. The member 42, when active, has its forward end arranged to engage the corners of advancing cartons and causes them to turn 90° about their engaged corners during their advance by the rollers 39. The cartons are then advanced, in their turned position, along a guide face of member 42 which is parallel with but spaced inwardly of the adjacent guide rail of the conveyor section 38. When cartons are not to be turned, the member 42 is rocked about a pivot 43 so as to extend obliquely toward the adjacent guide rail, rather than present a shoulder in the path of carton advance. The member 42 is provided at its free end with a rigidly connected, slotted operating arm 44 into the slot of which extends a fixed guide pin 45. The slot in the arm 44 is in the form of an arc having the pivot 43 as its center of curvature. Arm 44 is carried away from or into the path of advance of the cartons by an operator who may simply grasp the end of the arm for this purpose. The member 42 is also provided with a series of rollers 46 along which the advancing cartons may conveniently slide.

Advancing cartons pass from the conveyor section 38 onto a loading platform or table 47 on which are formed, firstly, successive rows of cartons and then a number of such rows to provide the tiers of cartons to be delivered to the pallets 30. The table 47 comprises a plurality of powered laterally disposed rollers 48 extending from the rear wall 47A of table 47 outwardly. Starting adjacent the outer ends of the lateral rollers 48 is a series of rollers 49, disposed at right angles to the rollers 48 and suitably powered for carrying cartons in a direction away from the rear wall 47A and toward a pickup area of the table 47 designated generally as 50. The tops of rollers 49 are normally slightly below the level of the tops of rollers 48 so that rollers 49 will not interfere with the advance of the cartons by rollers 48 which are of sufficient length to support at least half of a carton even when the latter is presented lengthwise of these rollers. A fixed guide member 51 extends along the rear of the table 47 parallel to and adjacent the wall 47A. The member 51 constitutes an extension of the member 42 and is aligned with the latter when member 42 is in the position shown in Fig. 1. Member 51 is provided with freely rotatable disk rollers 52. Cartons advancing across the rear of the table 47 on the rollers 48 strike a side wall 53 which is provided with disk rollers 54 adapted to assist subsequent lateral travel of the cartons. The location of the side wall 53 may be made adjustable to permit centering of the tier under the suction head.

When the desired number of cartons for forming one row of a tier extends along the rear of the table 47, the rear portion of the table 47, including the three rearmost rollers 49, is tilted upwardly about an axis 55 (Fig. 1). Also tilted upwardly is a frame carrying a plurality of freely rotatable disk rollers or skate wheels 56. These rollers 56 normally have their tops below the tops of rollers 48 but when the frame is tilted upwardly, as explained, they are carried to present their tops above the rollers 48. The axes of rollers 48 are fixed and are not elevated or tilted at this time. When the rear portion of the table 47 is tilted upwardly, cartons thereon roll forward on the disks 56 under action of gravity and are engaged by the powered rollers 49 which carry the same toward the front end of the table 47 forming the pick-up station or area 50. To form the tier 60 shown on the pallet 30 at the left of Fig. 1, three cartons would be lined up at the rear of the table 47 in side-by-side relationship and carried to the pick up area 50. Next, two cartons would be lined up end-to-end and carried forward followed by two additional cartons end-to-end to complete the tier. The construction and operation of the rollers 48 and 49 and the skate wheels 56 as well as the construction and operation of the table 47 will be described in greater detail hereinafter.

When a tier 62 is formed at the pick-up area 50, a suction head 63 (Fig. 2) descends from the solid line position of Fig. 2 to the position shown in dotted lines and designated 63A. The suction head 63 comprises a rigid upper portion 64 and a flexible apron-like portion 65 which may conveniently be made of rubber or like material. When the head is in its lowered position, the apron portion 65 should extend completely around the periphery of the tier 62 and should extend downwardly a substantial distance below the tops of the cartons along the outer sides and ends of the same. Preferably, the rigid portion 64 of the suction head 63 is adapted to rest against the tops of the cartons at this time. When the suction head 63 is in the position 63A in relation to the cartons forming the tier 62, which are then on the pick-up area 50, the air within the suction head and around the portions of the cartons encompassed by the apron 65 is evacuated by means of a flexible and extensible tube 66 connected with a suction blower 67 whereby the apron 65 is sucked into tight engagement with the outer sides and ends of the cartons and the cartons themselves are forced tightly against each other. Tube 66 may suitably be of an accordion pleated construction to enable it to be extended and contracted as the suction head is lowered and raised. The suction head 63 together with the tier 62, which is tightly grasped by the apron, is then raised to the solid line position 63. The suction head and retained cartons are then carried to a side position such as that shown at 63B of Fig. 2. The suction head and depending cartons then are lowered until the bottoms of the cartons forming the tier 62 are resting firmly on the right-hand pallet 30, at which time air is admitted to the tube 66 to release the suction and free the apron 65 from the cartons. The suction head 63 is then free to return to its initial position ready to engage the next tier of cartons and carry the latter to the pallet 30 to form a second tier of cartons. The formation of the next tier will have been carried on during the interval in which the suction head 63 was traveling to and from the right-hand pallet 30.

At the left-hand side of Fig. 2 there is shown a fully loaded pallet having four tiers of cartons thereon. In the arrangement illustrated, this pallet has been loaded before the right-hand pallet and is ready to be carried away by a suitable lift truck. The arrangement is such that, as soon as one pallet is loaded, the suction head carries the successive tiers to the pallet on the other side to load the latter. As soon as this second pallet is loaded, the suction head carries the successive tiers in the other direction to load a new pallet which has been placed at the point from which the first pallet has been removed. If desired, a plurality of superposed pallets may be provided at each side of the roller table so that it will not be necessary to place an unloaded pallet in position each time a loaded pallet is removed. The lift truck will then simply pick up the top pallet with its load of cartons. While two pallet loading positions have been illustrated, it will be evident that a single one could be used or three or more positions could be provided if a suitable mechanism for directing and carrying the suction head 63 were provided.

The tier 68 in Fig. 2 corresponds in pattern to the tier 62 shown on the pick-up area 50. It has been generally found advisable to provide a different pattern for alternate tiers. Accordingly, the tier designated 69 has an opposite pattern relationship to the tier 68, i. e., it has two rows of cartons arranged end-to-end and then one row of three cartons arranged side-by-side.

For a depalletizing operation, loaded pallets may be placed to the right and to the left of the area 50 as shown in Fig. 3 wherein a loaded pallet is illustrated to the right of the table. In Fig. 3, the suction head 63 is shown in solid lines in its upper right-hand position carrying a retained tier of cartons 70 previously seized and lifted from the pallet 30. The suction head 63 carries the tier 70 to the central position designated as 63C and from there moves downwardly to deposit the tier, as indicated at 71, on the area 50 of table 47. After depositing the tier the suction head is lifted to position 63C, then moved laterally over the pallet 30 and downwardly to seize the next tier.

For depalletizing, the rollers 49 are powered to carry a deposited tier of cartons toward the rear of the table 47. The member 53 should be removed to permit delivery of the cartons from the rear portion of the table 47 to a conveyor section 75 comprising a series of powered rollers 76 suitably driven by a motor 77. The cartons are delivered to the conveyor section 75 by suitably rotating the rollers 48 of the table 47. Preferably, the rollers 76 operate at a higher speed than the rollers 48 so that successive rows of cartons may be spaced to facilitate turning. Laterally disposed cartons leaving the table 47 engage a fixed guide member 78 extending outwardly into the path of advance of the cartons and are turned into longitudinal disposition. Longitudinally disposed cartons leaving the table 47 will not be engaged by the member 78 and hence will be carried onwardly in their original disposition. The cartons leaving the conveyor section 75 are delivered to a conveyor section 79 corresponding to the section 32 and are carried to whatever point is desired.

The operating and controlling devices for bringing about the various operations described above, in proper sequence, will now be explained.

The table 47, which is shown most clearly in Figs. 7 through 10, comprises the pick-up area 50 and a receiving area designated generally as 90. The pick-up area 50 is bounded by three side walls or frame members 91, 92 and 93. The front portion of the table 47, bounded by the side members 91, 92 and 93, is supported at the front end thereof by leg members 47' and adjacent the rear of the area 50 by suitable support means, not shown, on which rest side members 38' and 75' forming a part of the conveyor sections 38 and 75, respectively. The receiving area 90 of the table 47 may suitably be supported by legs, blocks or other frame means in the same manner as the conveyor sections are supported. The rollers 49A–49H, which are suitably journaled in the frame members 91 and 93, are powered for rotation by means of an endless belt 95 (Fig. 10) adapted to engage the under sides of these rollers and extending between pulleys 96 and 97 carried on shafts 98 and 99, respectively. The shaft 98 is journaled at one end thereof in a member (not shown) depending from the frame member 93 and may be otherwise suitably supported. At its other end the shaft 98 is connected to the shaft of an electric motor 101 (Fig. 7) which serves to drive the shaft 98 and the pulley 96 and hence, through the belt 95, the rollers 49A–49H. An idler roller 102 may be provided to take up slack in the belt 95 and maintain it tightly in engagement with the drums 96 and 97 and the rollers 49A–49H. The shaft 99, which carries the drum 97, may suitably be journaled in the side members 91 and 93 or extensions thereof. The rollers 49I–49L are similarly powered by means of an endless belt 105 carried on drums 106 and 107 mounted for rotation on shafts 108 and 109, respectively. Shaft 108 is journaled at one end thereof in a depending extension of the frame member 93 and may be otherwise suitably supported. At its other end the shaft 108 is coupled to the shaft of an electric motor 110 which serves to rotate the shaft 108 and hence, through the drums 106 and 107, to drive the belt 105 and the rollers 49I–49L. As best shown in Fig. 8, the rollers 49L–49N are each provided adjacent one end thereof with a chain sprocket adapted to carry an endless chain 111 which serves to rotate the rollers 49L–49N when the roller 49L is powered from the belt 105 and the other rollers are lifted from the belt upon tilting of the frame carrying the three rollers about the pivot 55, as explained. If desired, the rollers 49M and 49N could be powered directly from the belt 105. At the rear of the table 47 there are provided laterally extending rollers 48A–48K each journaled at one end thereof in the rear wall member 49 and at the other end thereof in a front wall member 49'. The rollers 48A–48K are powered for rotation by means of an endless belt 112 carried on a series of idler rollers of which the rollers 113 and 114 are shown in Fig. 10. The drums and motor for driving the belt 112 are not shown in the drawings but may conveniently be constructed in the same manner as the corresponding elements provided for driving the rollers 49. The rollers 113 and 114 are in part supported by a bracket 115 carried on a frame member 116. tI will be understood that other suitable supports are also provided.

In each of the spaces between the successive rollers 48 there is provided a respective one of a series of channel members 120A–120J, each provided with three spaced slots adapted to accommodate a respective one of the wheels or disks 56. Each of the wheels 56 is mounted on an axle (not shown) journaled for rotation in opposite legs of the channel members 120A–120J. At the rear end thereof, the members 120A–120J are affixed to an end plate or member 121. At the other end thereof, each of the members 120A–120J is affixed to another end plate or member 122. The plates 121 and 122 are affixed at opposite ends thereof to transverse bars 123 and 124. The longitudinal rollers 49L–49M are journaled for rotation in openings provided in the bars 123 and 124. These bars are pivoted about pins 125 and 126, respectively, which pins are suitably mounted in frame members (not shown) and provide the pivotal axis 55 hereinbefore mentioned. The arrangement is such that the bars 123 and 124 together with the members 120 and the wheels 56 may be rocked about the pins 125 and 126 as pivots, thus providing for the tilting of the rear portion of the table 47, as previously described. To effect this rocking motion, the frame member 116 (Fig. 10) has mounted thereon an air cylinder and piston assembly 128. The outer end of the piston 129 of the assembly 128 is pivotally attached to an arm 130, the latter in turn being affixed to a shaft 132 which also carries a cam member 131. When the piston 129 is caused to travel into the cylinder 128, the arm and the cam 131 rock about the axis of shaft 132 which is suitably supported by the frame. The operating surface of the cam 131 is adapted to engage a follower 133 mounted in a bracket 135 which is affixed to the frame formed by bars 121, 122, 123 and 124 so that rocking of the cam 131 in a counter clockwise direction will cause the frame carrying the wheels 56 to tilt upwardly about the pins 125 and 126 to the dotted-line position shown in Fig. 10. When the wheels 56 are in the upper dotted-line position thereof, cartons formerly resting on the rollers 48 will be lifted slightly from these rollers and will be placed on a slight incline and caused to roll forward on to the rollers 49, partially due to the action of gravity and partially due to engagement of the forward lower edges of the cartons with the rearmost powered roller 49N. The tilting of the cartons with the frame serves to bring about this engagement. When cartons advance from the front of the table 47 toward the rear thereof, during a depalletizing operation, it will also be desired to have the wheels 56 raised so that the cartons may ride over the rollers 48 out of engagement therewith. Roller 49N will impart the final rearward movement to the cartons. When the cartons have reached the desired rearward position, in which the rearward faces thereof engage the wheels 54, the frame carrying the wheels 56 will be returned to its horizontal position and the rollers 48 are powered to advance the cartons off the table 47 and on to the adjacent conveyor section 75. It will be evident that both the palletizing and depalletizing operations may be effected through the use of the same conveyor section rather than oppositely located conveyor sections as shown in Fig. 1. For such an arrangement, the rollers 48 would be powered in opposite directions for palletizing and depalletizing, whereas in the arrangement of Fig. 1 the rollers 48 are always powered in the same direction. More particularly, in the arrangement of Fig. 1 the rollers 48 carry cartons from right to left for both palletizing and depalletizing. If it were desired to feed depalletized cartons toward the conveyor section 31 rather than the section 79, the rollers 48 and 39 and the belt 34 should be powered to carry cartons toward the right and the conveyor sections 75 and 79 could be omitted. Preferably the rollers 48 are constantly powered but they may, if desired, be driven only when the cartons are to be advanced across the table.

In order to provide for orderly removal of the cartons from the table 47 during depalletizing, there is provided a stop bar 140 which is adapted to be raised into the path of carton advance off the area 50 of the table 47. The stop bar 140 is connected to a pair of arms 141 arranged to rock about an axis aligned with the shaft 99, under control of a piston 142 pivotally connected to the downwardly extending end of one of the arms 141 remote from the stop bar 140. The piston 142 is mounted in an air cylinder 143, similar to the cylinder 128, pivotally carried by the frame. When a tier of cartons is deposited on the area 50 by the suction head 63, the rollers 49 are powered to carry the same toward the rear of the table 47. The belt 105 is operated at a higher speed than the belt 95 in order to provide a separation between rows of cartons. After the first row of cartons is advanced beyond the stop bar 140, this stop bar is raised to engage the leading edges of the cartons of the succeeding row and to hold these latter cartons until the first row is transferred by the rollers 48 to a conveyor section, at which time the stop bar 140 is lowered to permit advance of the succeeding row of cartons. As soon as this further row of cartons has passed the stop bar 140, the latter is again raised to hold the next row of cartons. The relative speeds of the belts 95 and 105 and their related rollers 49 is preferably such that each row of cartons will be advanced beyond the stop bar 140 in time to permit the lifting of the latter again into active position before the next row reaches this position. If desired, the stop bar 140 could be eliminated by properly relating the speeds of the belts 95 and 105 so that each rank of units will clear the table before the next rank is delivered to the rear end of the table.

As best shown in Fig. 7, the suction head 63 is suspended from a carriage or trolley 150 which is generally rectangular in shape and formed by a flat top member and a surrounding frame structure. This carriage is carried on a pair of rails, in the form of parallel I beams 151 and 152, by means of wheels 153, 154, 155 and 156 arranged to ride on the inwardly extending lower flanges of the I beams 151 and 152. The wheels 153 and 154 are mounted on an axle 157 journaled adjacent either end thereof in suitable openings provided in the trolley 150. Similarly, the wheels 155 and 156 are mounted on an axle 158 journaled adjacent either end thereof in openings provided in the trolley 150.

The suction head 63 is suspended by means of cables 160–163, each of which is connected at one end thereof to the top member 64 of the suction head 63 and at the other end thereof is connected with and wrapped around and adapted to be rolled up on one of a pair of drums 164 and 165, as will be described in greater detail hereinafter. Vertical motion of the suction head 63 is guided by means of spaced guide bars 166–169 provided adjacent respective corners of the suction head. The bars 166–169 are affixed at the upper ends thereof to the trolley 150 and extend downwardly parallel to the vertical path of motion of the suction head 63. Additional guidance for the suction head 63 is provided by vertical rods 170 and 171 which are affixed at the upper ends thereof to the trolley 150 and which extend vertically downward to points adjacent the front end of the table 47. Brackets 172 and 173 are provided at the front end of the top member 64 of the suction head 63 and surround the rods 170 and 171, respectively, so that the suction head 63 is definitely confined to vertical motion by the rods 170 and 171. The bars 166–169 serve a similar function by being adapted for engagement of one surface of each one thereof with the adjacent edge of member 64 of the suction head 63 when the suction head is lifted. However, the bars 166–169 do not extend downwardly toward the table 47 as far as do the rods 170 and 171 and hence primarily provide stability during sideward movement of the suction head with the trolley. If desired, greater rigidity may be secured by providing laterally extending members interconnecting the bars 166–169 and guide rods 170 and 171 adjacent their lower ends.

As indicated in Figs. 2 and 7, the I beams 151 and 152 extend over the pick-up area 50 of the table 47 to each side of the same to a position slightly beyond the right-hand and left-hand pallets 30. Suitable posts may be provided for supporting the outer ends of the rails. The trolley 150 and the depending suction head 63 are adapted to travel along the I beams 151 and 152 to the right and to the left of the pick-up area 50 in order to permit the suction head 63 to be vertically aligned with the pallets. Movement of the trolley 150 along the rails is effected by means of a reversible electric motor 175 mounted on the top of the trolley 150 and provided with a chain sprocket or pulley 176. A similar chain sprocket or pulley 177 is carried by the axle 157. The sprockets 176 and 177 are interconnected by means of an endless chain 178 or other suitable means passing through suitable holes provided in the top of the trolley 150. When the electric motor 175 is energized to rotate in one direction, the trolley 150 is carried in one direction. Opposite rotation of the motor 175 causes the trolley 150 to travel in the other direction. The suction head 63 is connected to the blower 67 by means of a flexible bellows-like or accordion pleated tube 66 extending from the center of the top portion 64 of the suction head 63 to a point slightly beneath the trolley 150. The upper end of the tube 66 is connected through a relief valve 180 (Figs. 9 and 10) and a rigid tube 181 to the air intake side of the blower 67. The blower 67, mounted on the top of the trolley, is operated by an electric motor 182 which is also mounted on the top of the trolley 150. If desired, the blower 67 and motor 182 may be mounted on the I beams 151 and 152 or other suitable frame members. In such case, the blower would be connected to the relief valve 180 through a flexible bellows-like tube similar to the tube 66. So also, if desired, the relief valve 180 could be mounted adjacent the blower 67 and connected to the tube 66, or a suitable fitting at the upper end of this tube, through a suitable flexible tube of similar construction. The relief valve 180 is adapted, in a closed position thereof, to apply the suction to the suction head 63 and in an open position thereof to admit air to the tube 181, thus releasing the suction.

Referring now particularly to Figs. 9 and 10, it will be observed that the cables 160–163 pass over pulleys 190–193, respectively, in going from the suction head 63 to the drums 164 and 165. Each of the pulleys 190–193 is suspended from the trolley 150 by means of a bracket and axle arrangement such as that comprising the arms 194 and 195 and the axle 196 provided for the pulley 190. The drums 164 and 165 are mounted adjacent opposite ends of a shaft 197 carried by the trolley 150 by means of arms 198 and 199 depending from the trolley 150. The shaft 197 is journaled for rotation, adjacent either end thereof, in the arms 198 and 199 and carries a chain sprocket 200 arranged to be driven by a chain 201 which also passes around a sprocket on a shaft 202 of a reversible electric motor 203 depending from and carried by the trolley 150. Rotation of the motor 203 produces rotation of the shaft 197 and hence of the drums 164 and 165. Rotation in one direction will cause the cables 160–163 to be paid out and hence will cause the head 63 to descend by gravity, while rotation in the other direction will cause the cables to wind up on the drums and hence to raise the head 63. The cables are arranged to wind up on opposite sides of the associated drums and the ends thereof pass through holes provided in the peripheral surfaces of the drums and terminate inside the drums. To rigidly hold the cables, the ends thereof located within the drums may be formed with an eye passed around a bolt such as the bolt 204 (Fig. 10). In order to insure even winding and unwinding of the cables, the drums are provided with radially extending flange portions at their ends and with crossbars 205 and 206, respectively.

As is best shown in Fig. 15 for the drum 165, a plate 206A is spring urged against the cables 162 and 163 by springs 206B and 206C extending between the plates 206A and the bar 206. The plate 206A exerts sufficient pressure on the cable loops to keep the same flat against the peripheral surface of the drum. A similar mechanism is provided for the drum 164.

As will be described more fully hereinafter, certain machine operations are controlled by the presence or absence of slack in the cable. Thus there is provided an electrical switch 210 arranged to be operated by a slack cable mechanism designated generally as 211 (Fig. 10). The details of this mechanism 211 are shown most clearly in Fig. 16. An L-shaped bracket member 212 depends from the trolley 150 and is provided at the free end thereof with a hole adapted to receive a pin 213 on which is pivoted a bell crank lever 214. One end of the lever 214 is connected by means of a rod 215 to the operating arm 216 of the switch 210. The other end of the lever 214 is provided with a hole adapted to receive a pin 217 and a further hole spaced from the pin 217 and adapted to receive another pin 218. The pin 217 carries a rotatable counterweight 219 shown most clearly in Fig. 8. The pin 218 carries a rotatable pulley member 220. The cable 162 is adapted to pass between the counterweight 217 and the pulley member 220. When the cable 162 is taut, as indicated by the solid lines of Fig. 16, the counterweight 219 and pulley 220 are carried upwardly under action of the cable 162 and the bell crank lever is rotated in a clockwise direction about the pin 213. When the cable 162 is slack, the counterweight 219 causes the bell crank lever to rock in a counterclockwise direction about the pin 213 and hence operates the switch arm 216 to the opposite position thereof. The connections from the switch 210 are such that when the operating arm 216 is in the full line position of Fig. 16, current will be supplied to the motor 203 to drive the shaft 197. However, when slack is provided in the cable, as by engagement of the suction head 63 with the tops of the cartons on table 47, the switch arm 216 will be shifted to the dotted line position and the supply of current to motor 203 will be interrupted, through certain relay connections to be described.

As best shown in Figs. 10 and 11, the upper portion 64 of the suction head 63 is provided with a central hole adapted to receive the lower end of the flexible tube 66. The suction head 63, as shown in Figs. 11 and 12, comprises a rectangular wooden top member 225 which is provided with a sheet metal covering 226 having flanges 227 extending downwardly over the edges of the member 225 to a point some distance below this member. The flanges 227 are provided with holes adapted to receive a number of bolts 228. These are secured to the flanges by welding or riveting or the like. The flexible apron-like or curtain member 65 is held against the flange portion 227 adjacent the upper end thereof by means of metal plates 229 which are urged into engagement with the curtain 65 by wing nuts 230 threaded on the outer ends of the bolts 228. In the preferred embodiment, which is adapted for the handling of cartons of different sizes or shapes at different times, the flanges 227 and the curtain member 65 extend around only three sides of the box-like enclosure. The fourth side is provided by a separate adjustable plate and curtain member, as will be explained. A plurality of wooden block members 231 is provided beneath the member 225 and they are affixed thereto by means of screws 231A (Fig. 13) or other suitable fastening devices. The blocks adjacent the edges of the member 225 may be supported also by angle members 232, welded or otherwise secured to the flanges 227, and screws 233, shown in Fig. 12. The blocks 231 support a metal screen 234, suitably fastened to the blocks and to the angle members 232, which is adapted to engage the tops of the cartons as the suction head 63 descends.

If desired, the suction head may be made adjustable in size to enable the same to seize and transport tiers of cartons of different dimensions. For this purpose, there is provided beneath a portion of the top member 225 a generally W-shaped metal plate member 235 which carries three spaced pairs of tracks 236, 237 and 238 adapted to accommodate slidably the head ends of bolts 239, 240 and 241, respectively. These bolts extend upwardly through the member 225 and the metal sheet 226 and are provided with wing nuts 242 at their threaded upper ends, for clamping the plate in adjusted position. The member 235 is provided with a downwardly extending flange portion 243 along the three outer edges thereof. Another flexible apron-like or curtain member 244 is affixed along the upper edge thereof to the flange 243 by means of plates 245 and screws 246, thus forming three sides of a box-like enclosure adapted to slide into the similar enclosure formed by the flanges 227 and member 65 to provide a box-like enclosure, of variable size, closed on four sides. A perforated metal member 247 is affixed to the bottom of the flange portions 243 and extends inwardly therefrom just beneath the screen 234. By backing off the wing nuts 242, the metal plate 235 and associated depending curtain 244 may be slid outwardly of the suction head to increase the effective size thereof. When the proper size is achieved, the wing nuts 242 are tightened up to clamp the parts together. It will be observed that when the plate 235 is in an inward position thereof the side portions of the aprons 65 and 244 overlap to a considerable extent. When the plate 235 is in its most outward position, a smaller overlap of the curtains will exist.

The wooden member 225 and its covering metal sheet 226 should be as large as the desired size of the fully extended suction head. The sliding plate 235 and its associated members are adapted to slide beneath the member 225 along the tracks 236, 237 and 238. If adjustability is not desired, the suction head may be constructed without the member 235, in which case the apron 65 will extend completely around the suction head and may have its vertical end edges united to provide an airtight seal or may simply have the end portions overlapped to provide an effective seal. However, in the arrangement illustrated, the depending carton-engaging curtain is formed in part by the apron 65 and in part by the apron 244. The rear wall of the box-like enclosure is formed by the apron 244 and, when the suction head is in its extended condition, portions of the adjacent side walls may be formed by the apron 244. In order to insure satisfactory sealing where suction is applied, some overlap should be provided between the aprons 244 and 65 at all times. The length or depth of the curtain beneath the screen 234 will be dependent to some extent on the weight and character of the cartons to be lifted. For tall, relatively heavy cartons the curtain should be sufficiently long to engage at least about the upper 40% of the carton height. If desired, means for shortening the curtain may be provided to enable use of the apparatus for cartons of different heights. Such means could include buttons or other fastening means provided along one or more planes intermediate the top and bottom of the curtain and adapted to retain mating fastening means provided along the lower end of the curtain, when this is folded upwardly to a desired extent. This type of arrangement would be desirable when the machine is to operate on relatively tall cartons at certain times and relatively low or flat cartons at other times.

While cartons having closed bottoms and tops will generally be easier to raise than cartons having open portions in the tops, the latter can be raised if sufficient suction is provided. In one embodiment of the invention a tier formed of eight open topped cartons loaded with filled bottles to a weight of 50 lbs. per carton were firmly retained by the curtain, as the latter was raised, by creating a suction within the curtain amounting to about 14" of water. The suction blower used was of the centrifugal type and driven by a 5 H. P. motor. This was found capable of maintaining the indicated suction in spite of unavoidable leakage of air into the enclosure through the passages provided around the bottles within the cartons. To prevent undue loss of suction, the depending apron or curtain should be relatively flexible so as to enable it to be drawn firmly against the sides of the cartons. While a wide variety of materials and thicknesses may be employed, one example of a suitable construction is a pure gum rubber apron having a thickness of about $\frac{1}{32}$ inch and a carton engaging length of about 12 inches.

It has been indicated above that the curtain "grips" the cartons when the suction is applied. The term "grip," as used in the specification and claims herein, means that the curtain is urged against the side walls of the cartons forming the periphery of a tier and serves in effect as a gasket to seal off the air leaks around the periphery of the tier. The tier is held against the head by the difference in pressure between the air outside the cartons and the air inside the head. The floor or lower sealing wall of the low pressure chamber within the head is then actually formed by the cartons in the tier. As an example, if the tier had an effective area of 12 square feet and the difference in pressure between the underside of the lids of the cartons (or the bottoms thereof if no lids are provided) and the air on top of the lids due to suction amounted to ½ pound per square inch, the resulting force tending to hold the cartons against the underside of the suction head would amount to over 800 pounds. In general, the curtain or "grip" serves to provide a vertical seal between the upper edges of the cartons or other units forming the periphery of a tier and the rigid portion of the suction head.

A modification of the palletizing and depalletizing arrangement hereinbefore described will now be discussed in connection with Figs. 4, 5, 6 and 17. Considering first the palletizing operation, cartons advancing along the conveyor section 275 having rollers driven by a motor 275' through a suitable belt or the like, corresponding to section 32 of Fig. 1, are delivered to a conveyor section 276 formed by rotating rollers 277 similarly operated by a motor 278. The rollers of the conveyor section 276 preferably operate at a higher speed than those of the section 275 in order to provide suitable spacing of the individual cartons. The turning of individual cartons, where necessary for the formation of the desired pattern, is effected by operating a turning pin 279 into the path of advance of cartons on the conveyor section 276. Operation of the turning pin 279 may be effected either manually or automatically and the pin functions in a manner similar to that of the arm 44 of Fig. 1. The advancing cartons are delivered from the conveyor section 276 onto a table, similar to the table 47, and designated generally as 280. Transverse rollers 281, provided on the table 280, may operate at the same speed as rollers 277 and are driven by a motor 281A. As shown in Fig. 17, the rollers 281 are engaged on the bottom surfaces thereof by an endless belt 281B driven by drums (not shown) rotated by the motor 281A. For pelletizing, a stop member corresponding to the member 53 of Fig. 1 (not shown in Fig. 4) should be provided adjacent the further end of the table 280 in order to prevent advancing cartons from leaving the table 280. When the number of cartons desired for the row being formed is lined up along the rear of the table 280, the roller 277 and 281 may be stopped (if desired) and the rear portion of the table 280, with the exception of the rollers 281, is tilted upwardly about an axis 285. The tilted position of the table 280 is shown most clearly in Fig.

17. When the table is tilted, the bottoms of the cartons are engaged by a group of forwardly extending endless chains or belts 283 which correspond in operation to the disks 56 of Fig. 1, except that the chains 283 are powered for advancing the cartons forwardly along the table 280. The chains 283 are each provided with a driving sprocket 284 mounted on axle 285 driven by an electric motor 286. Advancing cartons are delivered by the chains 283 to a series of rollers 287 powered by means of an endless belt 288 provided beneath the table 280 and adapted to engage the bottoms of the rollers 287. The belt 288 is mounted on drums 289 and 290, the latter being driven by an electric motor 291. The rollers 287 are preferably operated at a speed at which the rate of carton advance is much lower than the carton advance provided by the chains 283. If desired, the rollers 287 need not be powered but may be freely rotatable. In such case the forward end of the table is preferably tilted so that the cartons may be advanced by gravity.

The suction head 63 (Figs. 5 and 6) operates on the formed tiers of cartons in the same manner as described above for the Fig. 1 embodiment, in order to load or unload the pallets 30. For depalletizing, the direction of rotation of the rollers 287 and of advance of the chains 283 is reversed so as to carry cartons from the forward end of the table 280 to the rear end thereof. The rear portion of the table should be tilted while each row of the cartons is being advanced by the chains 283 in order that they may clear the rollers 281. The mechanism for tilting the table is not illustrated in the drawings but may correspond to that shown in Fig. 10 in which an air cylinder 128 operates a cam 131 engaging a follower carried by the tilting portion of the table.

When a row of cartons has reached the rear of the table 280, the latter is rocked downwardly and the rollers 281 are powered to advance the row onto a conveyor section 295 operated by an electric motor 295'. If desired, the rollers 281 may be continuously powered since they are effective only when the rear portion of the table is in its lowered position. Cartons are delivered from the conveyor 295 to a discharge conveyor 275C operated by an electric motor 275D. Conveyor section 295 is provided with a barrier member 296 extending into the path of carton advance for effecting turning of those cartons which are not in the desired orientation. As will be explained, those cartons which are disposed lengthwise across the table will be moved along a path unobstructed by the barrier 296. A barrier or stop arm 297 corresponding to the stop arm 140 (Fig. 7) is adapted to be raised into the path of carton advance during depalletizing to engage the leading edges of the cartons to prevent further advance thereof until the preceding row of cartons has cleared the table 280. The stop arm 297 may be operated by an air cylinder 297' corresponding to the cylinder 143 (Fig. 10) or by any other suitable mechanism.

The palletizing and depalletizing operations of the arrangements of Figs. 1 and 4 may be carried on under manual control, under semi-automatic control, or under fully automatic control. For manual operation, switching means should be provided for each of the operations to be carried out. For semi-automatic operation, an operator initiates certain sequences of operations, various parts of which follow along automatically. For fully automatic operation, all machine functions are suitably timed and controlled without the intervention of an operator. Various switches and counting mechanisms are required for the various types of operation, and these will be described during the course of the following discussion.

The circuit of Figs. 18 through 26 will refer to the arrangement of Fig. 4, although it should be understood that the operation thereof and the equipment required for the operation will be substantially identical for the arrangement of Fig. 1. For purposes of discussion, patterns of seven and eight cartons will be discussed, although it will be evident that many other pattern arrangements are possible with appropriate circuit modifications. Two suitable pattern arrangements, for seven-carton tiers are shown in Figs. 18A and 18B, while two suitable carton arrangements for eight-carton tiers are shown in Figs. 19A and 19B.

When starting up the equipment to stack tiers in a pattern of eight cartons, the first tier, as shown in Fig. 19B, consists of a first row of two cartons permitted to come in straight, i. e., in the end-to-end relationship in which they are fed on the conveyor section 275. The second row consists of three cartons turned 90°, while the third row consists of three cartons similarly turned 90°, yielding a pattern of three rows made up of eight cartons. The second tier will be placed on the loading table 280 with a first row of three cartons turned 90°, a second row of three cartons similarly turned 90°, and a third row of two cartons permitted to come in straight again, yielding again a total of three rows made up of eight cartons, but in opposite relationship. This second tier is shown in Fig. 19A. The third tier will be the same as the first, the fourth tier will be the same as the second, and so on. Thus for automatic operation the order of aligning cartons will be first two cartons straight (at the commencement of operation only), next twelve cartons turned 90°, and thereafter four cartons straight and twelve turned until the run is complete.

For fully automatic operation, there are four principal switches to be set. The first of these is a ganged main operating switch MO. The second is a ganged two-position palletizing and depalletizing switch PD, the third switch is a ganged pattern selector switch PS, which, in the arrangement illustrated, is adapted to assume one of two positions, the first position providing a pattern of seven cartons and the second position providing a pattern of eight cartons. The fourth switch is a tier selector switch TS, which is adapted to set the number of tiers to be loaded on the pallets or to be unloaded from the pallets. These four switches, which must be pre-set, are illustrated in Fig. 20A. It will be observed that the main operating switch provides two manual positions designated M, an off position designated "Off," an automatic position designated "A," and a semi-automatic position designated "SA."

For convenience in interpretation of the drawing, the various contacts associated with the various relays and limit switches have not all been shown adjacent the relay coils but rather have been included at the points in the circuit wherein they operate. However, the contacts are designated with the same reference letter employed for the associated relay coil, and the different contacts of the various relays have been provided with additional numerals to differentiate one from the other. To commence automatic operation, power is supplied to the motor operating circuits by closing the triple-pole single-throw switch MC which supplies three phase power to the conductors 300, 301 and 302. Next, the main operating switch MO is thrown to the automatic position A, while the switch PD is in the palletizing position P, the pattern selector switch PS is, for example, in the eight position and the tier selector switch TS is, for example, in the six tier position as illustrated.

There will now be set forth a brief general description of the circuit operation which will be followed by a detailed description thereof. As soon as the main operating switch MO is turned to the automatic position thereof, the motor 275' is energized to operate the rollers of the accumulator conveyor section 275, the motor 278 which operates the rollers of the infeed conveyor section 276 is energized, the motor 281A which operates the rollers 281 of the table 280 is energized and the blower motor 182 is energized. The starting of each of these motors is effected through the action of a momentary operating relay E and an interlocking relay J (Fig. 19). The momentary relay E also acts to reset certain carton counting functions in case the machine had previously shut down with counts registered in the counting mechanisms. These counting functions include a carton count for pattern, a carton count for turning and a tier count.

For forming the first tier on the loading table 280, for a pattern of eight cartons, the first two cartons come from the accumulator conveyor section 275 onto the infeed conveyor section 276 and onto the rear portion of the table 280. As soon as the first two cartons are in position on the rear of the table 280, the leading edge of the leading carton abutting against a stop similar to the stop 53 of Fig. 1, the accumulator conveyor motor 275' stops, the tilting portions of the table 280 rock upwardly about the pivot 285 and the motor 286 is energized to power the chains 283 for carrying the cartons forward onto the pick-up portion of the table 280. Similarly, the motor 291 should be operated to power the rollers 287. As soon as the cartons are in position on the front end of the table 280, the tilting portion of the table rocks downwardly to its original position and the accumulator motor 275' and the motors 278 and 281A are energized to carry cartons toward the table 280. The next three cartons should be turned 90° before being delivered to the table 280 and should be carried forward to the pick-up position. Similarly, the succeeding three cartons, forming the last row of the first tier, should be turned 90° and then carried forward.

For performing these operations, there are provided a solenoid 279' adapted, when energized, to retract the turning pin 279, a photoelectric cell or electric eye 308 to count cartons advancing past the pin 279 and to operate the carton count for aligning mechanism, and triggering switches TS1–TS5 located on the rear portion of the table 280 and adapted to operate the mechanism which tilts the table 280 and which stops the advancing conveyors until a row of cartons has been powered forward on the table 280. Also provided are a group of switches AS located adjacent the stop bar 297. The AS switches are adapted to be operated by cartons advancing forwardly on the table 280 and are arranged, in the case of an incomplete pattern, to start up the feeding conveyors and, in the case of a full pattern on the table 280, to operate in conjunction with the carton counting for pattern mechanism and empty pallet switches EP, to operate the palletizing mechanism to transfer the tier onto the proper pallet. After the number of tiers called for by the tier selector switch TS have been loaded on a pallet, a gong or other signaling device will be operated to indicate to a fork truck operator that a pallet is ready to be removed. Through the action of a relay designated O (Fig. 23), the machine will then proceed to automatically fill the pallet on the opposite side of the table 280 provided, of course, that there is an empty pallet located in the position as indicated by the operation of the appropriate empty pallet switch EP.

The circuit arrangement and operation thereof will now be described in detail. Turning the switch MO to the automatic position thereof causes the relay E to be energized momentarily through a circuit extending from A. C. conductor 303 through an A contact of switch MO, through the coil of relay E, through a normally closed contact J1 of relay J, and through a conductor 304 to ground. The momentary energization of relay E will complete an energizing circuit for relay J extending from the conductor 303 through the A contact of switch MO, through the coil of relay J, through the normally open contact E1 of relay E and conductor 304 to ground. When energized, the relay J locks up through normally open contacts J2 which bridge the contacts E1. Operation of relay J closes normally open contacts J3 thereof, applying the power from conductor 303 to a conductor 303'. Energization of relay E similarly causes energization of a relay Z (Fig. 23) through a circuit extending from A. C. conductor 305 through the coil of relay Z, through an 8 contact of switch PS, and through normally open contacts E2 of relay E and conductor 306 to ground. Relay Z locks up through a circuit extending from conductor 305 through the coil of relay Z, through contact 8 of switch PS, through normally open contacts Z1 of relay Z, and through normally closed contacts Y1 of a relay Y and conductor 306 to ground.

Operation of relay E completes an energizing circuit for a blower motor starter coil BLST (Fig. 19) extending from conductor 303 through coil BLST, normally open contacts E3 and conductor 304 to ground. Operation of coil BLST closes contacts BLST1, 2 and 3 in the energizing circuit of motor 182, thus starting the latter. Coil BLST locks up through normally closed contacts OLB1 and normally open contacts J4 and BLST4 bridging the contacts E3. The contacts OLB1 are arranged to open if an overload condition develops in the motor 182, overload heaters OLB being connected in two of the power leads to the motor 182.

The primary winding of a transformer V is connected across the conductors 303 and 304. The opposite terminals of the secondary winding V' of transformer V are connected across the terminals of a suction switch V1 so that current flows through winding V' when the switch V1 is closed. The switch V1 is arranged to be closed when a predetermined suction is applied to the head 63, such predetermined suction being below the normal suction existing under load conditions. Normally open contacts V'1 of winding V' are arranged to close an energizing circuit for a relay VV between the conductors 303 and 304. Normally open contacts VV1 of relay VV bridge the contacts OLB1 and J4 so that the blower motor 182 cannot accidentally be stopped while the suction head 63 is carrying a load.

Since a relay W (Fig. 23) is open, the turning or aligning pin 279 (Fig. 4) is retracted by its solenoid 279', which is energized through a circuit extending from conductor 305 through normally closed contacts GG15, the solenoid 279' and through normally closed contacts W1 of relay W and conductor 306 to ground. The aligning pin 279 is arranged to be withdrawn from the path of carton advance when its associated solenoid 279' is energized so that the first carton will come through unturned. Adjacent the aligning pin 279 in Fig. 4 there is provided a photoelectric cell counting arrangement comprising a light source 307 and a photoelectric cell 308 arranged to actuate a stepping switch BCA1 (Fig. 24) each time the light beam from source 307 is restored after being broken by an advancing carton. The stepping or counting switch BCA1 is operated by coil BCA (Fig. 26) one count by the completion of a circuit extending from positive D. C. terminal 309 through a conductor 310, the coil BCA, a resistor 311, normally closed contacts CLA1 of a relay CLA, a normally closed test switch 312, normally open contacts PH1' of photo-switch PH1 (operated by photoelectric cell 308) and through a conductor 313 to the negative D. C. terminal 314. Thus each time a carton passes the photoelectric cell 308, the contacts PH1' are closed and coil BCA is energized, resulting in the switch BCA1 advancing one count. The successive steps assumed by the switch BCA1 are numbered 1 through 16. The switch BCA1 may be a rotary stepping switch or any other suitable type of switch adapted to be advanced one step or contact each time its associated coil is energized. In the arrangement illustrated, the switch BCA1 is made up of seventeen pairs of contacts, one contact of each pair being normally open and one normally closed. Each normally open contact is connected to the normally closed contact of the succeeding pair. As the count advances, the open contacts of a pair close while the closed contacts open.

A suitable switching mechanism of the type shown in the drawing together with its operating and reset coils is sold under the designation Magnetic Impulse Counter by the Kellogg Switchboard and Supply Company of Chicago, Illinois.

The coil of relay CLA bridges the coil BCA and the contacts CLA1 so as to open the energizing circuit for coil BCA a short time after the coil BCA is energized. Such time might be, for example, about .02 second.

The stepping switch BCA1 is advanced two positions by the first two cartons to pass the photoelectric cell 308. After the passage of the second carton, relay coil W–aux (Fig. 24) will be energized through a circuit extending from D. C. terminal 315 through the adjacent A contact of switch MO and the adjacent P contact of switch PD, a conductor 316, a coil W–aux, normally closed photo-switch contacts PH1″, an 8 contact of switch PS, normally open contacts Z2 of relay Z, the second normally open and third normally closed contacts of switch BCA1, the normally closed contacts Y2 of relay Y and a conductor 317 to the negative D. C. terminal 318. Energization of the relay W–aux results in energization of relay W, the circuit extending from conductor 305 through the coil of relay W, the normally open contact W–aux–1 of relay W–aux and conductor 306 to ground. Energization of relay W opens normally closed contacts W1 of relay W, thus opening the energizing circuit for aligning pin solenoid 279′ so that the aligning or turning pin 279 will enter the path of carton advance ready to turn the third carton as the same advances along the conveyor section 276. The photoelectric cell 308 and associated switch contacts PH1′ together with coil BCA and the switch BCA1 will count the next twelve cartons, the switch BCA1 advancing one count for each counted carton.

During this counting operation relay W–aux will remain energized despite periodic opening of contacts PH1″ because of normally open contacts W1′ interconnecting the coil of relay W–aux and contacts Y2. Each of the twelve advancing cartons will be turned 90° by engagement with the pin 279. The overall number of cartons counted by the stepping switch BCA1 will then be fourteen. As soon as the fourteenth carton has been counted, the coil of relay Y–aux (Fig. 24) will be energized through a circuit extending from D. C. conductor 316, the coil of relay Y–aux, an 8 contact of switch PS, normally open contact Z3 of relay Z, the fourteenth normally open contacts and fifteenth normally closed contacts of switch BCA1, the normally closed contacts Y2 of relay Y and conductor 317 to the negative D. C. terminal 318. Energization of relay Y–aux will result in energization of relay Y (Fig. 23) through a circuit extending from conductor 305 through the coil of relay Y and through normally open contacts Y–aux–1 of relay Y–aux and conductor 306 to ground. Relay Y is a slow to operate timing relay which may be set to operate in a convenient time such as ½ second. When the relay Y operates, the relay Z will be de-energized at normally closed contacts Y1 while the relay W will be de-energized because of de-energization of relay W–aux at normally closed contacts Y2. De-energization of relay W–aux will open the energizing circuit for relay W at contacts W–aux–1. Energization of relay Y also results in energization of carton count aligning reset coil BCAR (Fig. 26) through a circuit extending from conductor 310, the coil BCAR, a resistor 320, the normally closed contacts CLB1 of relay CLB, normally open contacts Y3 of relay Y and conductor 313 to negative D. C. terminal 314. Energization of coil BCAR operates to reset switch BCA1 to zero count. Relay CLB operates to open the energizing circuit of coil BCAR a short time after the latter is closed. De-energization of relay W will cause normally closed contacts W1 thereof to close, thereby energizing the solenoid 279′ whereby the pin 279 will be retracted and succeeding cartons permitted to advance toward the table 280 without being turned.

The counting switch BCA1 will now count off four additional cartons through successive energizations of coil BCA under control of photo-switch contacts PH1′. After the fourth carton has been counted, relay W–aux will pick up through normally closed photo-switch contacts PH1″, the fourth set of normally open contacts and the fifth set of normally closed contacts of switch BCA1, and normally closed contacts Y2 of relay Y. As a result of the energization of relay W–aux, the contacts W–aux–1 will close, resulting in energization of relay W and in opening of contacts W1 thereof, whereby the solenoid 279′ will be de-energized, allowing the pin 279 to enter the path of carton advance to turn succeeding cartons. Twelve cartons will now be counted by the counting switch BCA′, bringing the overall count on the switch BCA1 to sixteen. At this point, relay Y–aux will be energized through the sixteenth normally open and seventeenth normally closed contacts of switch BCA1, resulting in energization of the solenoid 279′ and retraction of the pin 279. The reset coil BCAR will likewise be energized as described above to return the count of the switch BCA1 to zero in preparation for repeating the counting cycle. This cycle of four cartons unturned and twelve turned will continue until the run is completed.

For a pattern of seven cartons, such as the ones shown in Figs. 18A and 18B, the relay X (Fig. 23) will be energized initially through contacts E2 in the same manner as was the relay Z for a pattern of eight, and will lock up through contacts X1 and then operate in the same manner as did the Z relay. It will be observed that the switch PS will be set on the 7 contacts thereof for the pattern of seven. Contacts X2′ and X3′ of relay X perform circuit functions similar to those performed by contacts Z2 and Z3 of relay Z.

There has been described above the circuit operation involved in the selective turning of the cartons. Another counting operation which is performed involves a counting of the cartons for tier formation, which will be described, with the pattern selector switch PS assumed in the eight position thereof in which eight cartons form a tier. This counting function is performed by a counting switch BCP1 (which may be constructed in the same manner as the switch BCA1) under control of impulse coil BCP. The coil BCP is energized each time the normally open photo-switch contacts PH1′ are closed by the breaking of the light beam impinging on the photoelectric cell 308, i. e., each time a carton passes through this light beam. The energizing circuit for coil BCP is the same circuit provided for coil BCA. When a count of eight is reached by switch BCP1, relay N–aux (Fig. 24) is energized through a circuit extending from conductor 316 through the coil of relay N–aux, an 8 contact of switch PS, the eighth normally open contacts and ninth normally closed contacts of switch BCP1 and conductor 317 to the negative D. C. terminal. Energization of relay N–aux results in energization of relay N (Fig. 23), the circuit extending from conductor 305 through the coil of relay N, the normally open contacts N–aux–1 and the conductor 306 to ground.

Energization of relay N results in a number of operations. The motor 275′, which operates the rollers of conveyor section 275, is stopped by the opening of its starter coil 275″ (Fig. 19) at normally closed contacts N1. The energizing circuit for the starter coil 275″ normally is closed upon energization of relay J through a circuit extending from the high side of the A. C. line through conductor 303, contacts J3, conductor 303′, a stop motion switch 325, a conductor 326, normally closed overload contacts OLA1 (operated by overload heaters OLA in the circuit of motor 275′), the coil 275″, normally closed contacts N1, normally closed contacts I1, normally closed contacts EE1, normally closed contacts GG1 and conductor 304 to ground. When the coil 275" is energized, the motor 275' operates the conveyor section 275 and delivers cartons to the infeed conveyor section 276. The conveyor section 275 will remain idle until the relay N drops out later. However, if for some reason a carton has not come to rest at the infeed end of the conveyor section 275, normally closed contacts PH2' of photo-switch PH2 will remain closed and, since these contacts bridge the contacts N1 and I1, motor 275' will continue to operate until a carton is so disposed, blocking the light beam from a source 307' directed to the photocell 308' which operates switch PH1.

At the same time that the motor 275' is initially energized to operate the accumulator conveyor section 275, the motors 278, 281A and 295' are to be energized to operate their respective conveyor sections. For convenience, only a single motor has been shown in the circuit diagram since all three of motors 278, 281A and 295' are operated together. These motors will be called the infeed and discharge conveyor motors, and are labeled in the circuit diagram IDM. The starter coil for the motors IDM is designated IDM' (Fig. 19) and is energized through a circuit extending from conductor 326 through the coil IDM', through normally closed contacts EE2, normally closed contacts EE1, normally closed contacts GG1, and conductor 304 to ground. When the relay EE is operated subsequently, the energizing circuit for coil IDM' is completed through normally open contacts EE3 bridging the normally closed contacts EE1 and EE2. Normally closed overload contacts OLI1 are included in the circuit for coil IDM' and are arranged to be operated by overload heaters OLI included in the power circuit to motors IDM. Under some circumstances, it may be desirable to replace the three motors 278, 281A and 295' with a single motor and suitable mechanical connections for driving the corresponding rollers at the desired speeds. The circuit connections for such an arrangement would be identical with the ones shown. It should be observed that the motors IDM continue to operate even when operation of the relay N stops the accumulator conveyor motor 275'.

Figure 21:
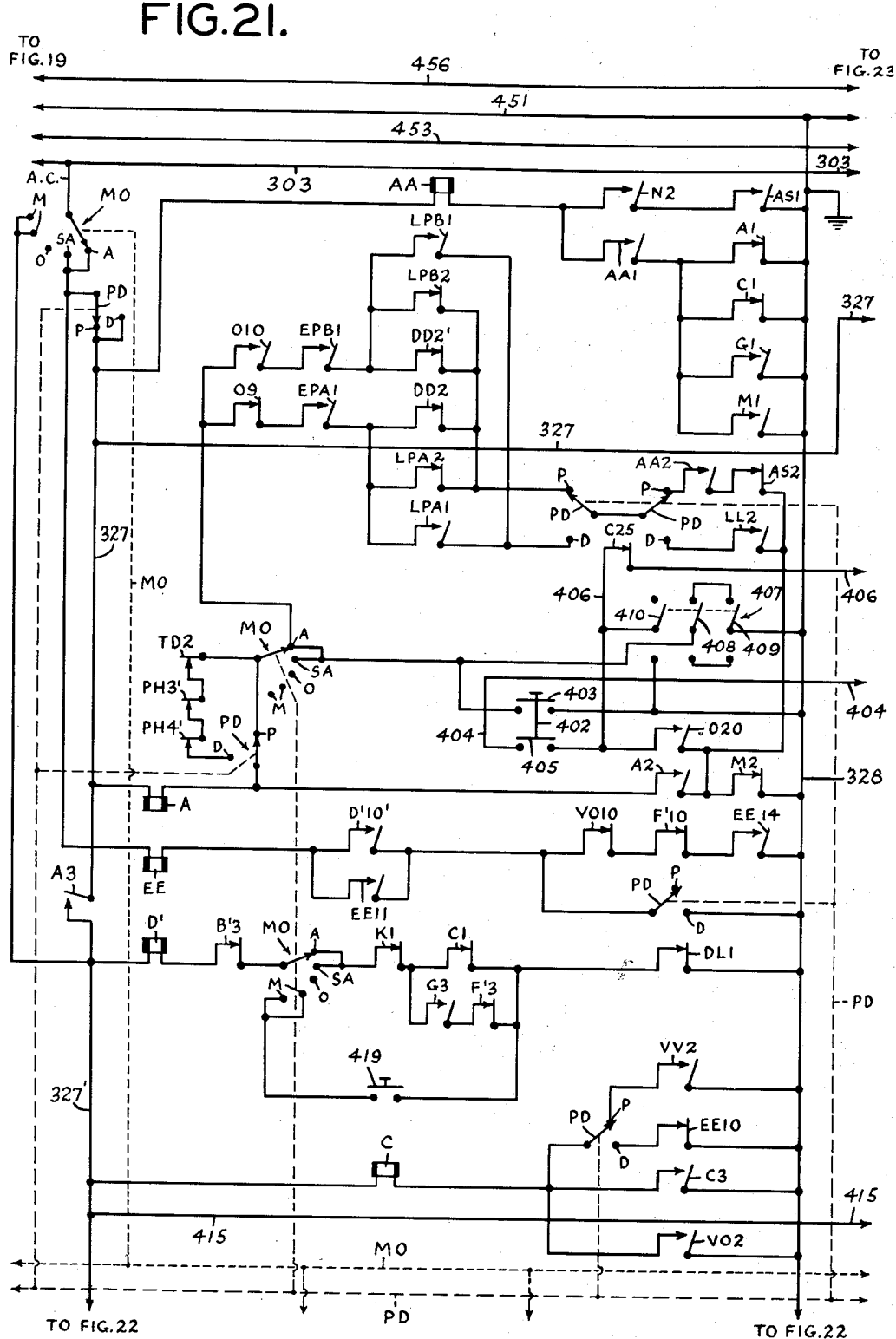
Figure 22:
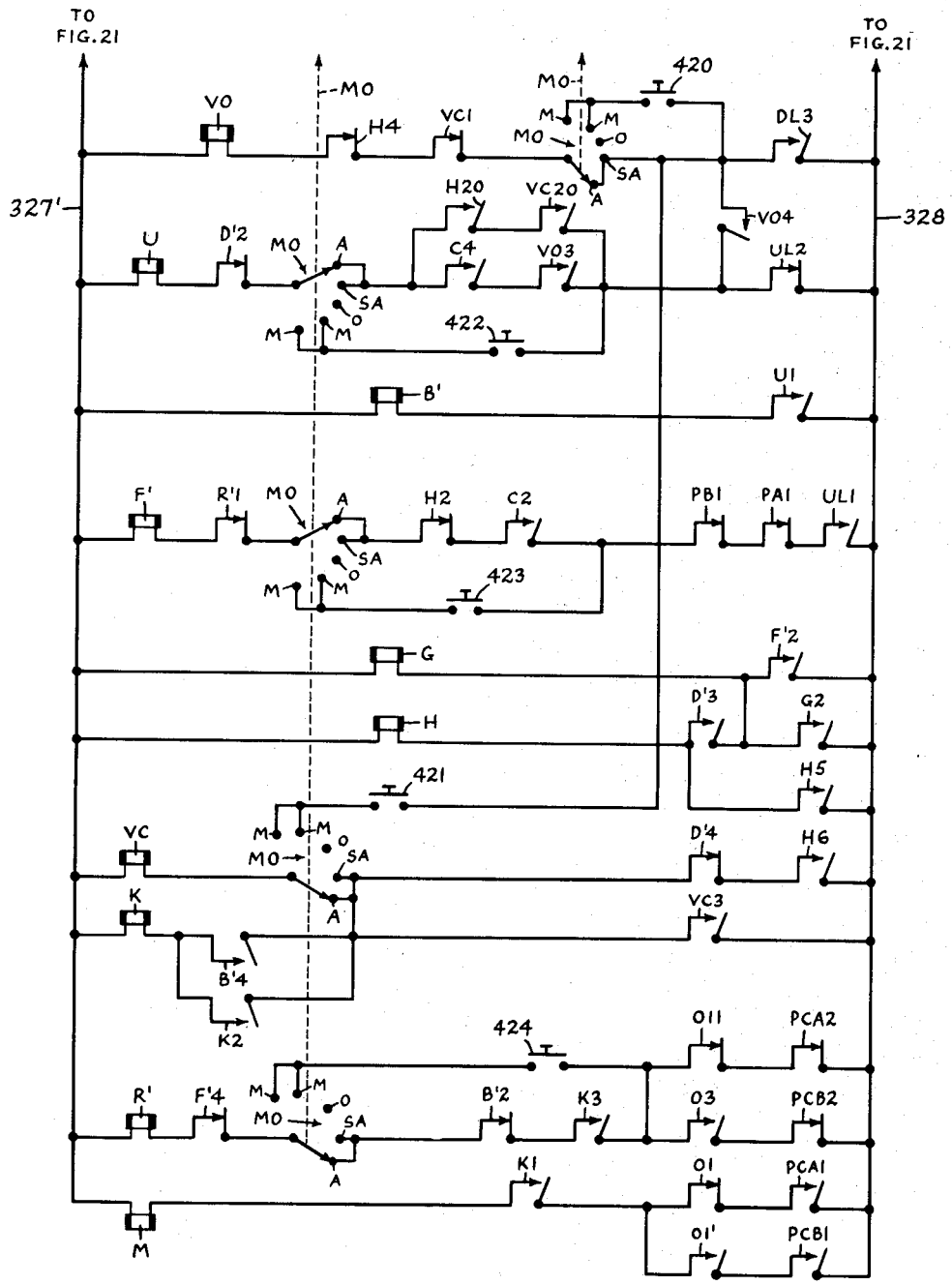
Figure 23:
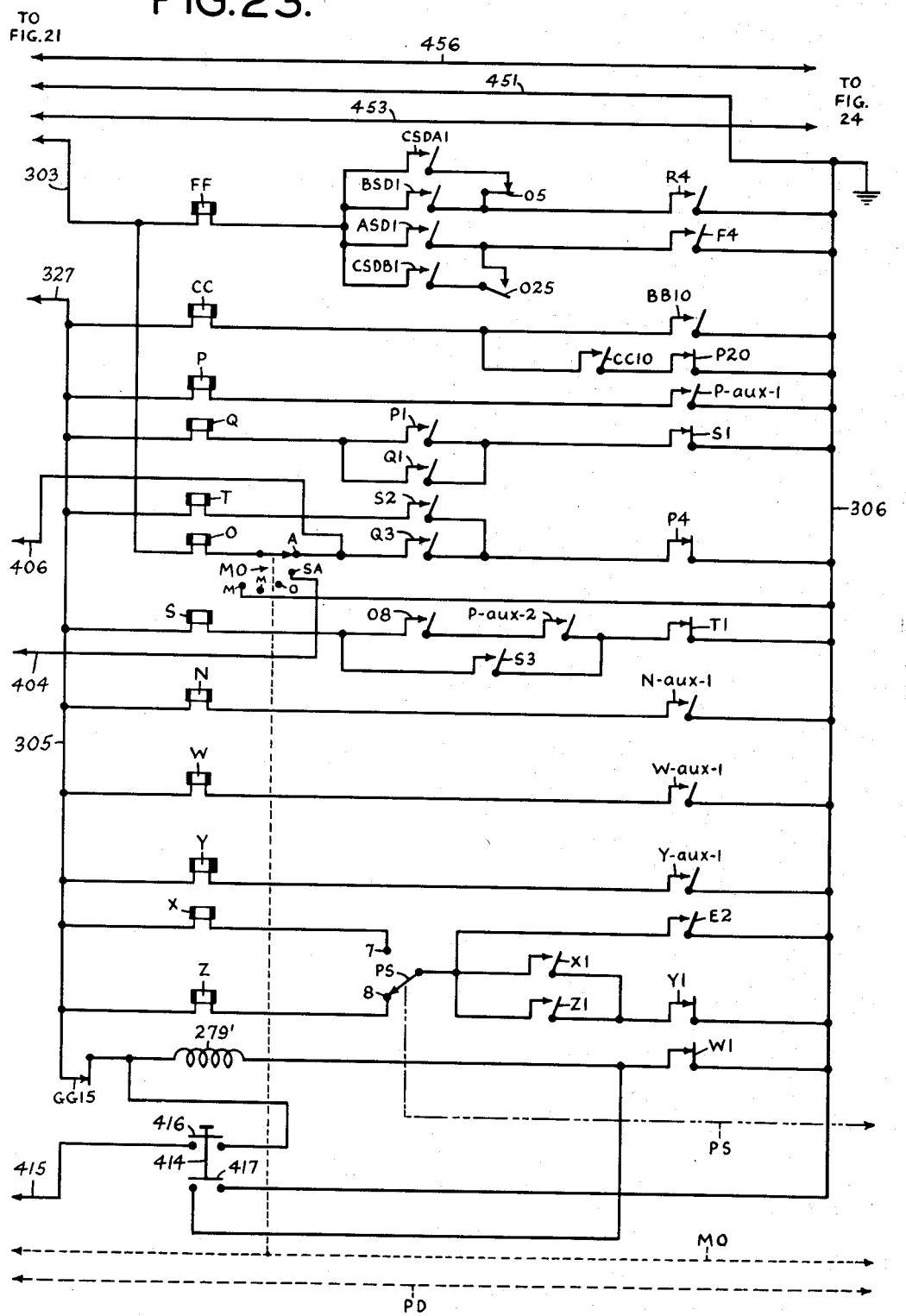
Figure 24:
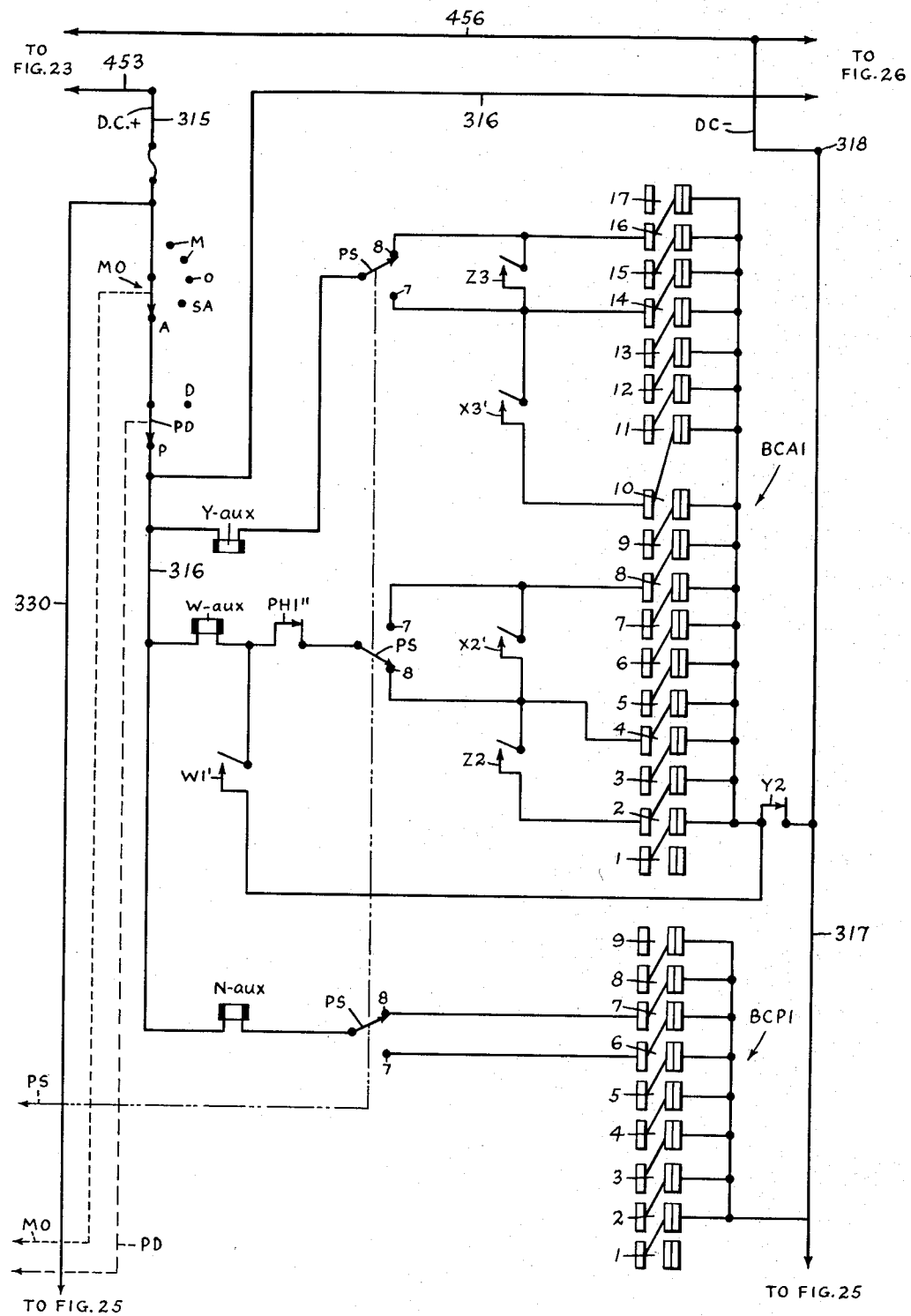
Figure 25:
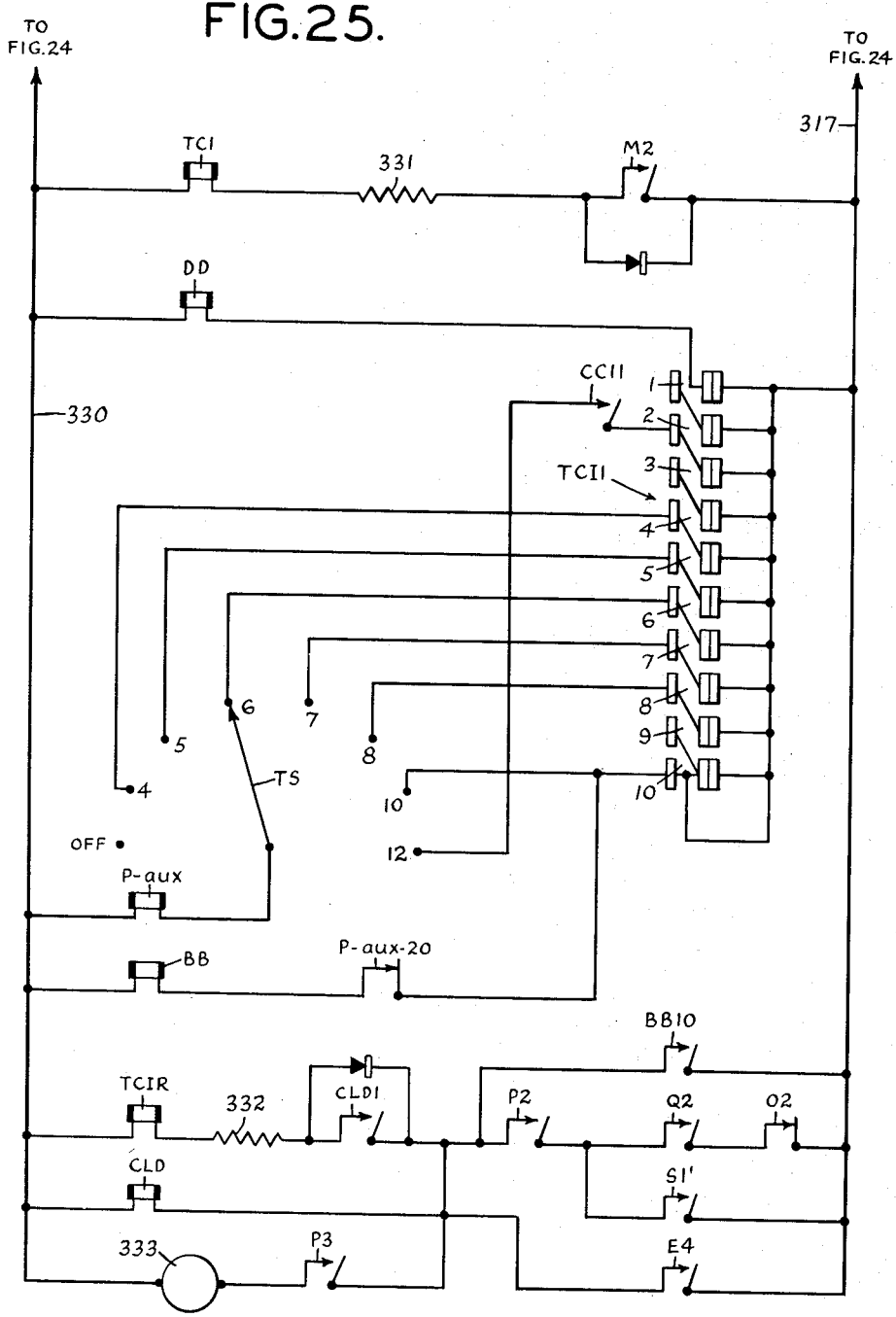

Another function effected by energizing the relay N is to set up the relay AA (Fig. 21). The relay AA will be energized as soon as the last row of cartons in a particular tier has been powered onto the front or pick-up portion of the table 280, this last row tripping a switch AS which is arranged in the path of carton advance along the table 280. The energizing circuit for relay AA extends from a source of A. C. potential through A contacts of switch MO, P contacts of switch PD, through a conductor 327, the coil of relay AA, the normally open contacts N2 of relay N, and through the normally open contacts AS1 of switch AS and a conductor 328 to ground. Once energized, the relay AA will lock up through a circuit bridging the contacts N2 and AS1 and including the normally open contacts AA1 and one or more of the contacts A1, C1, G1 and M1, depending upon the point in the cycle of the machine at which the full pattern or tier is finally in pick-up position on the table 280. The machine cannot start a new cycle unless the relay AA has been operated indicating that the full load is ready on the table 280 for transfer to a pallet. This energization requires operation of the relay N and operation of switch AS.

Energization of relay N also sets up the energizing circuit for reset coil BCPR which, when energized, resets the count of switch BCP1 to zero. The energizing circuit for the coil BCPR extends from the conductor 310 through the coil BCPR, a resistor 329, normally closed contacts CLC1, normally open contacts N3, normally open contacts B1 of relay B, normally closed contacts H1 of relay H, and conductor 313 to negative D. C. terminal 314. The reset coil BCPR will actually be energized as soon as the contacts B1 close, which will occur when the suction head hoist motor 203 is energized, which occurs when the relay B is energized. Operation of coil BCPR operates relay CLC, in turn opening contacts CLC1 to drop out coil BCPR.

Another counting function which is performed is that of counting the tiers loaded on the pallet. This operation will be described in connection with a setting of switch TS for six tiers or layers per pallet. The tier selector switch operates in conjunction with relays BB, CC, P, Q, T, S and O, which function to cause the suction head to load up the pallet on one side of the table 280 with the correct number of tiers and then automatically repeat the operation on the pallet located at the other side of the table 280. When operation is commencing, each of the above relays will be deenergized. When the suction head has transferred the first tier from the table 280 to an empty pallet at the right of the table 280 and has returned to the center raised position, as shown in solid lines in Fig. 6, the end of cycle relay M (Fig. 22) will be momentarily energized and will then be released. The energizing circuit for relay M extends from the conductor 327 through the coil of relay M, normally open contacts K1 of relay K, normally closed contacts O1 of relay O, and the normally open contacts PCA1 of center position limit switch PCA shown in Figs. 5 and 6. The relay M is energized through contacts O1 and PCA1 when the suction head returns to center after depositing a tier on a left-hand pallet (Fig. 5). For return from the right in Fig. 5, normally open contacts O1' and normally open contacts PCB1 serve to energize the relay M. The contacts K1 will have been closed when the relay K (Fig. 22) was energized by closing of contacts B1 when the hoist motor 203 was energized to raise the first tier from the table 280 (as will appear later). Once energized, the relay K locks up through contacts K2 thereof. A tier counting switch TCI1 (similar to the switches BCA1 and BCP1) is actuated by a tier count impulse coil TCI (Fig. 25) which is energized through a circuit extending from the positive D. C. contact 315 through a conductor 330, the coil TCI, a resistor 331, normally open contacts M2 of relay M, and the conductor 317 to negative D. C. terminal 318. Hence, when relay M is energized through closing of limit switch contacts PCA1 (or PCB1), the switch TCI1 will count one tier. When six tiers have been counted in this way, so that the switch TCI' stores six counts, the relay P–aux (Fig. 25) will be energized through a circuit extending from conductor 330 through the coil of relay P–aux, through a 6 contact of tier selector switch TS, through the sixth normally open contacts and seventh normally closed contacts of switch TCI1 and conductor 317 to negative D. C. terminal 318. When relay P–aux is energized, relay P (Fig. 23) will operate through a circuit extending from conductor 305 through the coil of relay P, contacts P–aux–1, and conductor 306 to ground. Energization of relay P in turn results in energization of relay Q (Fig. 23) through a circuit extending from conductor 305 through the coil of relay Q, normally open contacts P1, normally closed contacts S1, and conductor 306 to ground. When energized, the relay Q locks up through contacts Q1 thereof which bridge the contacts P1. Energization of relay Q operates tier count reset coil TCIR (Fig. 25) through a circuit extending from conductor 330 through the coil TCIR, through a resistor 332, normally open contacts CLD1, normally open contacts P2, normally open contacts Q2, normally closed contacts O2, and conductor 317 to the negative D. C. terminal. The contacts CLD1 are closed by energization of relay CLD the coil of which bridges the coil TCIR and the contacts CLD1. The coil TCIR operates to reset stepping switch TCI1 to zero count. At the same time the coil TCIR is energized, a single stroke gong or other signaling device 333 (Fig. 25) is energized to signal the completion of loading on the right-hand pallet. The gong 333 is energized through a circuit extending from conductor 330 through the gong 333, normally open contacts P3, P2 and Q2 and normally closed contacts O2 and conductor 317 to negative D. C. terminal 318. As soon as the switch TCI1 is reset to zero count, relays P–aux and P release. The relay O will then be energized through a circuit extending from conductor 303, the coil of relay O, automatic terminals of switch MO, normally open contacts Q3 and normally closed contacts P4 of relay P, and conductor 306 to ground. Relay O will remain energized until relay P is again picked up through completion of another full tier count of six on the opposite pallet. The gong 333 is again sounded to signal completion of loading on a pallet.

The switch TCI1 is made up of 10 normally open and 10 normally closed contacts connected as illustrated. In order to permit the use of this switch for the ocunting of more and 10 tiers, for example, 12 tiers, there is provided the relay BB having an energizing circuit extending from the conductor 330 through the coil of relay BB, normally closed contacts P–aux–20, the 10th normally open contacts of switch TCI1 and conductor 317 to negative D. C. terminal 318. Thus, relay BB will be energized when 10 tiers have been counted by the switch TCI1. Energization of the relay BB results in energizing of the relay CC through normally open contacts BB10 and conductor 306 to ground. When operated, the relay CC locks up through normally open contacts CC10 and P20 bridging the contacts BB10. Operation of relay CC closes contacts CC11 thereof setting up an energizing circuit for relay P–aux through the 12 contacts of switch TS. In this manner, the switch TS may be set for 12 tiers and upon the counting of the 12th tier by the switch TCI1 the relay P–aux will be energized as described above. It will be observed that additional contacts similar to the contacts CC11 could be provided to extend the counting range of the switch TCI1. If course, the switch TCI1 could be replaced with another switch having a larger number of contacts.

During one palletizing cycle in which a pallet is fully loaded with the desired number of tiers, the relay O is energized. Relay O thus serves to control the direction in which palletizing is carried on, i. e., to the right or to the left (in Figs. 5 and 6). During the succeeding palletizing cycles in which the opposite pallet is to be loaded, relay O will remain de-energized. This alternate energization of relay O will continue throughout the palletizing operations. During the cycles in which relay O is energized, the operating circuit for tier count reset coil TCIR cannot be completed through the normally closed contacts O2 of relay O. Hence, the contacts Q2 and O2 are bridged by normally open contacts S1' so that the desired resetting of switch TCI1 may be achieved. It will be observed that the relay S (Fig. 23) operates when relays O and P–aux are operated and relay T is deenergized, since the operating circuit for relay S includes normally open contacts O8 and P–aux–2 and normally closed contacts T1. When operated, relay S locks up because contacts S3 thereof bridge the contacts O8 and P–aux–2.

It was pointed out above that the initial momentary operation of relay E reset the counting mechanisms to zero. For this purpose, each of the reset coils is arranged to be operated through a respective one of contacts E4, E5 and E6.

Other functions which are performed include the operation of the trolley motor 175 which carries the trolley 150 between the center position over the table 280 and the right-hand (B) and left-hand (A) (Figs. 5 and 6) positions over the respective pallets. The suction head hoist motor 203 is also operated at appropriate times to raise and lower the suction head. Furthermore, the tilt solenoid TSV (Fig. 20) is operated at appropriate times to tilt the table 280 upwardly and downwardly about its pivot.

The feeding of cartons to form a pattern on the pickup area of the table 280 has been described. As will be apparent from the discussion hereinafter, as soon as a tier of cartons has been formed on the pick-up area, the relay A (Fig. 21), which may be considered the main cycling relay, will be triggered off to commence the next tier-carrying cycle. The following operations will be for the suction head to descend, pick up the formed tier from the table 280, rise to its upper center position, move toward the pallet being loaded, descend to the pallet to drop the tier thereon, return to its upper side position, and then return to its upper center position preparatory to commencement of a succeeding cycle. The upward motion of the suction head from the table 280 is initiated by operation of relay B. As soon as relay B operates, the energizing circuit for reset coil BCPR will be closed and carton counting switch BCP1 will be reset to zero count, dropping out relays N–aux and N. When relay N drops out, contacts N1 thereof close to complete the energizing circuit for the accumulator conveyor starter coil 275" so that cartons will again be advanced toward the table 280. During the succeeding time interval in which a tier of cartons is being deposited on a pallet and the suction head is returning to its upper center position, the next tier of cartons will be being formed on the table 280.

Operation of the trolley motor will first be considered. When the hoist motor 203 has raised the suction head to its upper center position, the trolley motor 175 should be energized to carry the trolley 150 to the right or to the left. For this purpose, there are provided pilot relays F' and R' (Fig. 22), which pick up to in turn pick up directional relays F and R (Fig. 19) in predetermined sequence determined by the condition of relay O during the palletizing cycle. The relay F' is provided with an energizing circuit extending from the conductor 327' through the coil of relay F', normally closed contacts R'1, and automatic contact of switch MO, normally closed contacts H2 of relay H, normally open contacts C2, normally closed end limit switch contacts PB1 and PA1, normally open upper limit switch contacts UL1, and conductor 328 to ground. The end limit switches PB and PA are operated by engagement of the trolley 150 with the switches PB and PA, shown in Figs. 5 and 6. The upper limit switch contacts UL1 are a part of the upper limit switch UL shown in Fig. 7 and arranged to be operated when the suction head 63 reaches its uppermost position. Thus for the relay F' to operate, the relays R' and H should be unoperated, the upper limit switch UL must be operated, and the end limit switches PB and PA should be unoperated. In other words, the trolley 150 should be in the center position thereof and the relay circuit should be in condition to cause motion of the trolley.

The relay R' is provided with a similar energizing circuit extending from the conductor 327' through the coil of relay R', through normally closed contacts F'4, through automatic contacts of switch MO, through normally closed contacts B'2, through normally open contacts K3, through normally open contacts O3 (or normally closed contacts O11), and through normally closed contacts PCB2 of center position limit switch PCB (or normally closed contacts PCA2) and conductor 328 to ground. It will be observed that the relay R' will be operated when the trolley is in a side position over a pallet. When the relay R' is operated, the relay F' cannot be operated because of the presence of normally closed contacts R'1 in the relay F' energizing circuit. Similarly, the presence of contacts F'4 in the relay R' energizing circuit prevents operation of relay R' when relay F' is energized.

When the first tier to be placed on a pallet has been raised with the suction head to the upper center position at which limit switch PCA (or PCB) will be operated, relay F' will be energized. Energization of relay F', when relay O is de-energized, will result in energization of relay F through a circuit extending from conductor 326 through normally closed overload contacts TOL1, the coil of relay F, normally closed contacts O3', and normally open contacts F'1 of relay F', and conductor 304 to ground. Energization of relay F closes contacts F1, F2 and F3 thereof, these contacts being included in the starting circuit for the trolley motor 175 and arranged to connect the same to the A. C. lines 300, 301 and 302 in a sense to operate the motor 175 to carry the trolley 150 toward the left (Fig. 4). Motion to the left will continue until relay F' is de-energized in response to opening of contacts PA1 of limit switch PA by engagement of the trolley 150 therewith. When the relay F' drops out, the relay F will likewise drop out because of opening of contacts F'1, resulting in removal of power from motor 175. Prior to operation of limit switch PA, a relay FF (Fig. 23) will be energized when the trolley operates a slowdown switch ASD located adjacent the switch PA. The energizing circuit for the relay FF extends from the conductor 303 through the coil of relay FF and through contacts ASD1 of switch ASD, and contacts F4 and conductor 306 to ground. Operation of the relay FF opens normally closed contacts FF1, FF2 and FF3 thereof, which place showdown resistors in the power lines supplying the motor 175, resulting in a slowing of the motor 175 prior to operation of the end limit switch PA. Slowing of the trolley motor prior to stopping thereof will ensure evenly stacked pallet tiers. To return the trolley to the center position thereof, the relay R' is energized through the circuit described above. Energization of the relay R' results in the energizing of relay R through a circuit extending from conductor 326 through overload contacts TOL1, through the coil of relay R, normally closed contacts O4 of relay O, and normally open contacts R'2 and conductor 304 to ground. The operation of relay R closes contacts R1, R2 and R3 thereof. These contacts are included in an operating circuit for motor 175 and are arranged to operate the latter in the reverse direction from that described above, and hence the trolley will be carried toward the right. Right-hand travel of the trolley will continue until the center limit switch PCA operates, opening the energizing circuit for relay R' at contacts PCA2 and resulting in de-energization of relay R at contacts R'2, whereby the contacts R1, R2 and R3 are opened. Prior to operation of the center limit switch PCA, a slowdown switch CSDA is operated by the trolley whereby contacts CSDA1 thereof close to energize the relay FF to again slow down the motor 175 before the latter is stopped. This energizing circuit for the relay FF extends from the conductor 303 through the coil of relay FF, contacts CSDA1, normally closed contacts O5, and normally open contacts R4 and conductor 306 to ground.

After six machine cycles have been completed, six being the number of tiers selected for a full pallet load in this example, the desired direction of travel of the trolley will be such as to load the right-hand pallet. For this purpose, the relay R should be operated ahead of the relay F so that travel to the right will precede travel to the left, rather than vice versa as described above. However, the relays F' and R' will pick up in the same sequence. First, the relay F' will pick up as described when a tier has been picked up by the suction head and carried to the upper center position. When relay F' picks up, relay R will pick up through a different circuit than the one described above, the circuit extending from conductor 326 through contacts TOL1, the coil of relay R, normally open contacts O6 of relay O, normally open contacts F'1, and conductor 304 to ground. It will be observed that the energizing circuit differs in that a normally open contact rather than a normally closed contact of relay O is employed. Accordingly, the relay O must be operated to ensure loading of the right-hand pallet.

The condition of relay O thus determines the direction in which the trolley motor 175 will be operated to palletize to the right or to the left, as the case may be. The energizing circuit for relay O includes normally open contacts Q3 and normally closed contacts P4. Each time the tier counting switch TCI1 has counted a full set of tiers, relay P will pick up, opening contacts P4 and dropping out relay O, if the latter were energized. Relay P will drop out upon resetting of switch TCI1, as described. Relay O will then pick up or remain de-energized depending on the condition of relay Q and contacts Q3 thereof. Relay Q is arranged to be energized through normally open contacts P1 and normally closed contacts S1, and to lock up through its own contacts Q1. Hence, relay Q will pick up if relay S is de-energized. Relay S, in turn, will have picked up previously if relay O has been energized and relay T de-energized, since contacts P–aux–2 will close after each full tier count. Relay S locks up by contacts S3 thereof bridging contacts O8 and P–aux–2. Relay T will have previously been energized if relay S had previously been energized to close contacts S2. Assuming relay T to be de-energized, relay S will pick up on closing of contacts P–aux–2. This will drop out relays Q and O and cause palletizing to the left since relay O is de-energized. As soon as relay P releases upon resetting of switch TCI1, relay T will pick up, causing relay S to drop out because of opening of contacts T1. With relay S dropped out, relay Q will be set up and will operate as soon as completion of the left-hand set of tiers causes contacts P1 to close. Relay Q then locks up through contacts Q1. With relay Q operated, relay O is set to operate as soon as contacts P4 close upon resetting of switch TCI1. With relay O operated, the next palletizing operation will be toward the right.

Returning again to the right-hand palletizing operation, when relay R picks up, the motor 175 will operate to carry the trolley to the right until the right-hand limit switch PB is operated, opening the energizing circuit for relay F' at normally closed contacts PB1. This results again in de-energization of the relay R at contacts F'1 and opening of the operating circuit for motor 175. Prior to operation of switch PB, slowdown switch BSD is operated to close contacts BSD1 thereof to again energize the slowdown relay FF. When the tier has been loaded on the right-hand pallet, the empty suction head returns to its upper position and is ready to travel towards the left to the center position thereof. For this purpose, the relay R' is energized through the circuit described above, resulting in energization of the relay F through a circuit extending from the conductor 326 through contacts TOL1, the coil of relay F, normally open contacts O7 of relay O, and normally open contacts R'2 and conductor 304 to ground. Again, normally open rather than normally closed contacts of the relay O are employed for achieving the desired direction of trolley travel. When the trolley again arrives at the center position thereof it operates center limit switch PCB to open contacts PCB2 thereof, thus opening the energizing circuit for relay R'. Again, a center slowdown switch CSDB is provided to operate the relay FF for slowing down the trolley motor before the trolley reaches the center position.

At the end of the sixth machine cycle, relays P–aux and P will again pick up under control of tier counting stepping switch TCI1, resulting in de-energization of relay O preparatory to the loading of a left-hand pallet. Energization of relay P will again operate the tier count reset coil TCIR and will operate the gong or other signaling device 333 through contacts P2 and P3, respectively. As soon as the tier count switch TCI1 is reset to zero count, relays P–aux and P will drop out and relay T will be energized through a circuit extending from conductor 305 through the coil of relay T, normally open contacts S2, normally closed contacts P4, and conductor 306 to ground. Energization of relay T will open the energizing circuit for relay S, which was previously closed, through a circuit extending from conductor 305 through the coil of relay S, through normally open contact S3 of relay S and normally closed contacts T1 and conductor 306 to ground. Relay S had originally been energized through normally open contacts O8 and P-aux-2 which bridge the contacts S3. De-energization of relay S opens the contacts S2 thereby dropping out relay T and returning the relays to their original de-energized conditions. The machine will now palletize in the direction set up by the normally closed contacts O3 and O4 of relay O.

Located adjacent each pallet position, on either side of the loading table 280, are two pallet switches. At the left-hand side the switches are designated EPA and LPA. At the right-hand side they are designated EPB and LPB. The EP switches will operate when either an empty or a loaded pallet is in place (since they are arranged to be operated when a weight at least as great as an empty pallet rests thereon), while the LP switches will operate only when a loaded pallet is in place (since they are arranged to be operated when a weight at least as great as a pallet with one tier of cartons rests thereon). Thus, during palletizing, if an empty pallet is in position at the left of table 280 (Fig. 4), the switch EPA1 will be closed.

When the trailing edge of the last row of the pattern formed on the loading table 280 has passed over the AS switches, relay A will be energized through a circuit extending from conductor 327 through the coil of relay A, a palletizing contact of switch PD, an automatic contact of switch MO, normally closed contacts O9 of relay O, the switch EPA1, normally closed contacts LPA2 of loaded pallet switch LPA, two palletizing contacts of the switch PD, a normally open contact AA2 of the relay AA, the normally closed switch contacts AS2, the normally closed contacts M2 and conductor 328 to ground. The relay AA will previously have been operated through contacts N2 and switch contacts AS1 and locked in through contacts AA1 and one of normally closed contacts A1, C1 or normally open contacts G1 and M1. After a first tier has been placed on the pallet, the tier count stepping switch TCI1 will advance one contact, de-energizing the coil of relay DD (Fig. 25) which had previously been made through the first normally closed contacts of switch TCI1. The palletized tier will actuate loaded pallet switch LPA. For the second and successive tiers, the relay A will be triggered through normally closed contacts O9 of relay O, switch EPA1, normally closed contacts DD2, two sets of palletizing contacts of switch DP, contacts AA2, switch contacts AS2 and contacts M2.

The circuit is similar for palletizing toward the right-hand side (Fig. 4) except that corresponding contacts of the switches EPB and LPB are employed rather than contacts of the switches EPA and LPA, normally open contacts O10 of relay O are used rather than the normally closed contacts O9, and normally closed contacts DD2' rather than DD2 are used.

Relay A, which may be considered the main cycling relay, is triggered off by the circuits described above. Once energized, the relay A locks up for the remainder of the cycle through a circuit extending from conductor 327 through the coil of relay A, normally open contacts A2 and normally closed contacts M2 and conductor 328 to ground. The relay M (Fig. 22), which is the end of cycle control relay, de-energizes the relay A at the end of each tier loading cycle.

Energization of relay A, described above, results in commencement of operation of the hoist motor 203 in a direction such as to lower the suction head 63 toward the tier of cartons formed on the pick-up portion of the table 280. For this purpose, a hoist down pilot relay D' (Fig. 21) is energized through a circuit extending from high side of the A. C. line through automatic contacts of the switch MO, through contacts of the switch PD, through conductor 327, through normally open contacts A3, a conductor 327', the coil of relay D', normally closed contacts B'3, automatic contacts of switch MO, normally closed contacts K1 of relay K, normally closed contacts C1 of relay C, and normally closed contacts DL1 of the slack cable or down limit switch 210. The contacts DL1 constitute a down limit switch arranged to be opened when the suction head hits the cartons on the table 280 causing the cable 162 to become slack, thus operating the down limit switch contacts DL1. Energization of the relay D' closes an energizing circuit for the relay D (Fig. 19) extending from the conductor 326 through normally closed contacts OL3, the coil of relay D, contacts D'1 and normally closed contacts DL2 of the slack cable switch 210, and conductor 304 to ground. Operation of the relay D closes contacts D1, D2 and D3 thereof, thereby supplying power to the hoist motor 203 in a sense to cause the latter to lower the suction head. When the suction head 63 strikes the cartons, thus operating switch 210, the down limit switch contacts DL1 and DL2 open to drop out the relays D' and D and to stop the hoist motor 203.

Operation of the switch 210 to its slack cable position, shown in dotted lines in Fig. 16, also closes an energizing circuit for a relay VO (Fig. 22), this circuit extending from the conductor 327 through the contacts A3, conductor 327', the coil of relay VO, normally closed contacts H4, normally closed contacts VC1 of a relay VC, automatic contacts of the main operating switch MO and normally open down limit switch contacts DL3 of the switch 210, and conductor 328 to ground. The operation of the relay VO serves to complete an energizing circuit for a solenoid 340 (Fig. 20) arranged to operate the suction valve 180 to a suction "on" position thereof in which the blower 179 is connected to the suction head 63 for sucking the apron of the suction head against the cartons to grip the latter. The energizing circuit for the solenoid 340 extends from A. C. conductor 303 through normally open contacts J3, conductor 303', solenoid 340, normally closed contacts EE1' of a relay EE, and normally open contacts VO1 and conductor 304 to ground. Operation of the relay VO also serves to energize the relay C which locks itself up and sets up the subsequent hoist upward motion of the suction head and the subsequent sideward motion of the trolley. The energizing circuit for the relay C (Fig. 21) extends from the conductor 327' through the coil of relay C and through normally open contacts VO2 and conductor 328 to ground. For locking up the relay C, contacts C3 thereof bridge the contacts VO2. Normally open contacts VV2 of the protective relay VV also bridge the contacts VO2 to prevent false cycling when changing from palletizing to depalletizing.

A slow to operate relay U (Fig. 22) which may be set to pick up after any convenient time delay, such as about ½ second, is energized through a circuit extending from conductor 327' through the coil of relay U, normally closed contacts D'2, an automatic contact of the switch MO, a normally open contact C4, a normally open contact VO3, and a normally closed set of upper limit contacts UL2. The contacts UL2 are arranged to be opened when the suction head 63 reaches the top of its travel. Energization of the relay U causes energization of a pilot relay B' (Fig. 22), the energizing circuit for the latter extending from the conductor 327' through the coil of relay B' and normally open contacts U1 of relay U and conductor 328 to ground. Energization of relay B' in turn produces energization of relay B through a circuit extending from conductor 326 through contacts OL3, the coil of relay B, contacts B'1 of relay B' and a normally closed set of contacts UOL3 of an upper over limit switch UOL and the conductor 304 to ground. Energization of relay B closes contacts B1', B2' and B3' thereof, thereby applying power to the hoist motor 203 in a sense to cause the latter to raise the suction head 63.

When the upper limit switch is actuated by arrival of the suction head 63 at the highest desired point of its travel, the relay U is de-energized at the upper limit switch contacts UL2, the relay B' is de-energized by the opening of contacts U1, and the relay B is de-energized by the opening of contacts B'1, thereby stopping the hoist motor 203. At this time the relay F' will be energized by the closing of normally open upper limit switch contacts UL1 to cause sideward travel of the trolley 150, as described above. The remainder of the energizing circuit of the relay F' was previously set up through the normally closed contacts H2 and the normally open contacts C2. Operation of relay F' results in energization of relay F, thereby supplying power to the trolley motor 175. The trolley then moves to the left. It should be observed that energization of relay F' also results in energization of relay G (Fig. 22) through a circuit extending from conductor 327', through the coil of relay G and through contacts F'2 and conductor 328 to ground. The relay G locks up through normally open contacts G2 thereof bridging the contacts F'2.

It should be observed that when normally open down limit switch contacts DL3 opened as the suction head moved upwardly of the table 280, the relay VO did not release because it had previously locked itself in through contacts VO4 and normally closed upper limit switch UL2 arranged to bridge the contacts DL3. However, when upper limit switch contacts UL2 open upon arrival of the suction head at the upper end of its arrival, relay VO becomes de-energized, which in turn de-energizes the suction valve open solenoid 340. However, the suction valve 180 is constructed so that it will not close upon de-energization of the solenoid 340 but will remain in the open position thereof until a suction valve closed solenoid 340' is energized.

When the left-hand end limit switch PA is operated by arrival of the trolley 150 at the left-hand pallet position, the relay F' becomes de-energized and the relay F drops out to stop the trolly motor 175, as described above. At this time, the hoist down pilot relay D' picks up through a circuit extending from conductor 327', the coil of relay D', normally closed contacts B'3, automatic contacts of the switch MO, normally closed contacts K1, normally open contacts G3, normally closed contacts F'3, and contacts DL1 and conductor 328 to ground. It will be remember that relay G was energized previously by operation of relay F'. As a result of energization of the down pilot relay D', the relay D becomes energized as described above and the hoist motor 203 is actuated to lower the suction head. At the same time the relay H (Fig. 22) is energized through a circuit extending from conductor 327' through the coil of relay H, normally open contacts D'3, and contacts G2 and conductor 328 to ground. Relay H locks up by means of contacts H5 thereof arranged to bridge the contacts D'3 and G2. The operation of relay H is provided to set up energizing circuits for the valve closed solenoid 340' and the hoist up operation.

When the down limit switch contacts of the slack cable switch 210 are operated by the slack condition of the cable 162 as the tier held by the apron strikes the pallet, the relays D' and D are de-energized, stopping the hoist motor 203. The relay VC (Fig. 22) is energized through a circuit extending from conductor 327' through the coil of relay VC, automatic contacts of the switch MO, normally closed contacts D'4 and normally open contacts H6 and conductor 328 to ground. Operation of the relay VC closes an energizing circuit for suction valve closed solenoid 340' (Fig. 20) extending from conductor 303' through the solenoid 340', normally closed contacts EE2', normally open contacts VC2, and conductor 304 to ground. Operation of solenoid 340' will cause the valve 180 to assume a suction "off" position thereof in which the blower is vented to the atmosphere to break the suction by which the curtain grips the cartons, thereby releasing the load.

When slow to operate relay U picks up upon release of relay D', the relay B' energizes through the circuit described above, resulting in energization of relay B through contacts B'1 and the normally closed contacts UL3 of the upper limit switch UL. Relay U is picked up through normally open contacts H20 and VC20 rather than C4 and VO3 because of the operation of relays H and VO. Energization of relay B starts the hoist motor 203 in a sense to carry the suction head upward. At the same time, the relay K (Fig. 22) is energized through a circuit extending from conductor 327' through the coil of relay K, normally open contacts B'4 and normally open contacts VC3 and conductor 328 to ground. When energized, relay K locks up by means of contacts K2 thereof bridging the contacts B'4. Energization of relay K sets up the energizing circuit for end of cycle relay M and de-energizes the vent valve solenoid 340'' at normally closed contacts K4.

When the suction head reaches the top of its travel, the normally closed contacts UL2 of the upper limit switch UL are opened, thereby de-energizing the relay U, which in turn de-energizes the relays B' and B to stop the hoist motor. The relay R' is then energized by the closing of normally closed contacts B'2, the remainder of the relay R' energizing circuit through the normally closed contacts F'4, the automatic contacts of the switch MO, the normally open contacts K3, the normally closed contacts O11, and the normally closed contacts PCA2 having previously been set up. Energization of relay R' results in energization of relay R and in turn operation of the trolley motor 175 in a direction to carry the trolley from the left-hand position thereof to the center position. When the normally closed contacts PCA2 of the center limit switch PCA are opened by arrival of the trolley at the center position thereof, the relay R' energizing circuit is opened, causing the trolley motor 175 to stop and closing the energizing circuit for end of cycle relay M. Operation of relay M opens normally closed contacts M2 thereof located in the energizing circuit for relay A, thereby dropping out relay A and opening contacts A3 to remove power from the conductor 327'. Removal of power from conductor 327' causes relays M, K, VC, H, G and C to drop out.

As soon as relay A is de-energized, it will be ready to commence a new palletizing cycle by completion of its energizing circuit through normally open contacts O10 and EPB1 or normally closed contacts O9 and normally open contacts EPA1, the remainder of the energizing circuit being the same as described above. The particular energizing circuit for relay A selected will depend upon the conditions of the empty pallet switches EPA and EPB and of the relay O.

It will be recalled that a portion of the loading table 260 should be rocked upwardly in order for the cartons arranged on the rear area thereof to be delivered forwardly to the pick-up area underneath the suction head 63. In order to indicate the proper disposition of cartons on the rear of the pick-up table 280, there are provided suitably spaced switch TS1–TS55 arranged to be operated by cartons resting thereon. The switches TS1–TS3 will be operated by cartons which have been turned by engagement with the pin 279, while the switches TS4 and TS5 will be operated by cartons which have not been turned. The table tilting mechanism is arranged to be operated by one or more air cylinders such as the cylinder 128 (Fig. 10) which is, in turn, controlled by solenoids TSV and TSV' (Fig. 20) which operate air valves to admit air to the cylinder 128 in one sense when the solenoids TSV and TSV' are energized and to admit air thereto in the other sense when these solenoids are de-energized.

The air cylinder or cylinders 128 are provided with a normally open valve operated by the solenoid TSV and arranged to allow air to enter the upper end of the cylinder when the solenoid TSV is de-energized so that air pressure is continually applied to the upper end of the piston when the solenoids are de-energized. A normally closed valve operated by the solenoid TSV' is arranged to vent the other end of the cylinder to the atmosphere when the solenoids are de-energized so that the piston will normally be at the lower end of the cylinder. When the solenoids TSV and TSV' are energized, the valve at the upper end of the cylinder and which is controlled by solenoid TSV will vent this end of the cylinder. However, the valve at the lower end of the cylinder and which is controlled by solenoid TSV' will admit air under pressure to the cylinder to force the piston toward the upper end of the cylinder and hence tilt the table.

The energizing circuit for the solenoids TSV and TSV' extends from the conductor 326 through the parallel connected solenoids TSV and TSV', normally open contacts I2, an automatic contact of switch MO, normally open contacts I3, a palletizing contact of switch PD, and conductor 304 to ground. In order for the solenoids TSV and TSV' to be energized, the relay I must be energized. The energizing circuit for the relay I extends from the conductor 326 through the coil of relay I, a resistor 340I, a palletizing contact of switch PD, an automatic contact of switch MO, at least one of two series circuits, one circuit comprising the normally open contacts TS1–TS3, and the other TS4 and TS5, a palletizing contact of the switch PD, and conductor 304 to ground. Thus, the relay I will be energized when turned cartons have operated the switches TS1–TS3, or unturned cartons have operated the switches TS4 and TS5. As soon as the relay I has been energized, the solenoid TSV will be energized by the closing of normally open contacts I2 and I3, thereby raising the tilting portion of the table 280, whereby the chains 283 will carry the cartons forwardly along the table 280 to the pick-up area thereof, the rollers 287 assisting in this operation. For releasing the solenoids TSV and TSV' to permit downward tilting of the table 280, there is provided a relay II (Fig. 20) having an energizing circuit extending from the conductor 326 through the coil of relay II, normally open contacts AS5 of switch AS, a palletizing contact of switch PD, an automatic contact of switch MO, the normally open contacts I3, a palletizing contact of switch PD, and conductor 304 to ground. Relay II will thus be energized when the contacts AS5 of switch AS are operated by cartons moving forwardly on the loading table 280. When operated, the relay II locks up through normally open contacts III thereof bridging the contacts AS5. The relay I is bridged by normally closed contacts AS6 of switch AS and normally open contacts II2 of relay II so that the coil of relay I will be shorted out and the relay I released upon simultaneous closing of contacts AS6 (which occurs when a row of cartons advances beyond the switch AS) and closing of contacts II2. Hence, a row of cartons moving forwardly along the table 280 will operate the switch AS so that the contacts AS5 thereof energize relay II, whereby the contacts AS6 and the contacts II2 may release relay I when the row of cartons advances beyond the switch AS. Release of relay I will open contacts I2 thereof, thus de-energizing the solenoid TSV and allowing the air to escape from the cylinder or cylinders 128, whereby the tiltable portion of the table 280 is tilted downwardly. In the arrangement of Fig. 4, the cartons will continue traveling forward because the loading table live roller conveyor motor 291 will still be energized to carry cartons to the pick-up area of the table 280. It should be observed that normally closed contacts I1 of relay I are included in the energizing circuit for the accumulator conveyor starter coil 275'', so that the accumulator conveyor cannot operate while the loading table is tilted.

The loading table live roller conveyor motor 291 and the motor 286 provided for operating the chains 283 are arranged to be operated to advance cartons forwardly along the table 280 to the pick-up area upon operation of a relay L'L' (Fig. 20), contacts L'L'1–L'L'3 thereof being included in the power circuits to the motors 291 and 286. The energizing circuit for the relay L'L' extends from conductor 326 through the coil of relay L'L', normally closed contacts KK10, one of parallel normally open contacts G5, D'10, and normally closed contacts A10, and a palletizing contact of switch PD and conductor 304 to ground. The relay L'L' and hence the motors 291 and 286 will be operated nearly continuously during the palletizing operation because of operation of the relays D' and G or release of the relay A.

The automatic operation of the circuit for depalletizing will now be described. While the sequence of machine operations required for depalletizing may generally be considered as the reverse of the palletizing operations, there are certain specific differences which will be noted more fully hereinafter. For depalletizing, the carton count for pattern and the carton count for aligning stepping switches BCA1 and BCP1, respectively, are not employed.

To start depalletizing operations, the switch MO should be turned to automatic and the switch PD to depalletizing. The tier selector switch TS should be set to the number of tiers to be unloaded from each pallet. Relay E will operate momentarily, as before, and the relay J will operate and lock up. Similarly, the motor 182 operating the air suction blower will start up. The infeed and discharge conveyor motors IDM are started up through energization of the starter coil IDM' through the circuit described above and including normally closed contacts EE2 and EE1. Similarly, the accumulator conveyor motor 275' and the depalletizing conveyor motor 275D will commence to operate by energization of the starter coil 275'' (Fig. 19) through normally closed contacts N1, I1, EE1 and GG1. It should be observed that the accumulator conveyor section 275 and the corresponding discharge section 275C could, if desired, both be operated by a single motor suitably coupled thereto.

The relay KK (Fig. 20) will be energized through a circuit extending from conductor 326 through the coil of relay KK, normally closed contacts C10, normally closed contacts D'10', normally closed contacts TD1 of a time delay switch TD, a depalletizing contact of switch PD, and conductor 304 to ground. A slow to operate relay LL (Fig. 20) is energized through a circuit extending from the conductor 326 through the coil of relay LL, a depalletizing contact of switch PD, an automatic contact of switch MO, a normally closed contact MM1 of relay MM, a depalletizing contact of switch PD, and conductor 304 to ground. The switch TD (Fig. 4) is arranged to be operated by interruption of a light beam from a source 349 and directed to a photocell 349'. The switch TD is made a time delay switch so that it will not have time to operate unless cartons are prevented from advancing along the discharge conveyor.

Provided a pallet loaded with one or more tiers is in place on one side of the table 280, the corresponding EP and LP switches will be operated. When relay LL energizes, after a short time delay, which might be about 5 seconds, the relay A will be energized to start the depalletizing cycle. The energizing circuit for the relay A extends from the conductor 327 through the coil of relay A, a depalletizing contact of switch PD, normally closed contacts PH4' and PH3' of photo-switches PH4 and PH3, respectively (the operation of which will be explained below), normally closed contacts TD2 of switch TD, an automatic contact of switch MO, normally closed contacts O9 of relay O (for depalletizing from a left-hand pallet in Fig. 4), normally open contacts EPA1 of switch EPA, normally open contacts LPA1 of the left-hand loaded pallet switch LPA, two sets of depalletizing contacts of switch PD, normally open contacts LL2, normally closed contacts M2, and conductor 328 to ground. The relay D' energizes momentarily through a circuit extending from conductor 327' through the coil of relay D', normally closed contacts B'3, an automatic contact of switch MO, normally closed contacts K1 and C1 and contacts DL1 of down limit switch DL, and conductor 328 to ground. Relay D' immediately drops out upon opening of contacts C1 by energization of relay C through a circuit extending from conductor 327' through the coil of relay C, a depalletizing contact of switch PD, normally closed contacts EE10, and conductor 328 to ground. Relay C locks up through contacts C3 thereof and remains operated for the remainder of the cycle. Energization of relay C causes the relay KK to drop out by the opening of contacts C10, thus stopping the motors 291 and 286. The momentary energization of relay D' completed an energizing circuit for relay EE (Fig. 21) extending from the A. C. line through an automatic contact of switch MO, the coil of relay EE, normally open contacts D'10, a depalletizing contact of switch PD, and conductor 328 to ground. Relay EE locks up through the closing of normally open contacts EE11 thereof bridging the contacts D'10, and remains operated throughout all ensuing depalletizing cycles.

The first operation in the first depalletizing cycle is for the trolley to immediately move to the loaded pallet to pick up a tier of cartons. For this purpose, the relay F' operates through the circuit described above and the closing of contacts F'1 thereof causes energization of relay F. Energization of relay F in turn operates the trolley motor 175 in a sense to cause the trolley to travel toward the left-hand pallet position, which (it is assumed) has been provided with a loaded pallet. The relay F' also operates relay G by closing contacts F'2, and thus energizes relay KK by means of contacts G10 bridging the contacts C10 and D'10. Operation of relay KK completes again the energizing circuit for the motors 291 and 286 through contacts KK1, KK2 and KK3, thus operating these motors in a sense opposite to that described for the palletizing operation, i. e., in a direction such as to carry cartons from the pick-up area of the loading table 280 toward the rear thereof.

When relay F' operates, it picks up relay F and actuates the motor 175 to carry the trolley toward the left-hand pallet. The trolley and suction head will go through exactly the same motion sequence as described in connection with the palletizing operation. However, for depalletizing, the operations of the suction valve solenoids 340 and 340', and hence of the suction valve, are reversed, i. e., the suction valve will now open when the machine is over the pallet and will close when the suction head is at the loading table. This change in sequence is brought about by energization of relay EE during the depalletizing operation, the circuit therefor having previously been described. It will be recalled that the suction valve open solenoid 340 was energized through normally closed contacts EE1' and normally open contacts VO1, whereas the suction valve closed solenoid 340' and the vent valve solenoid 340'' were energized through normally closed contacts EE2' and normally open contacts VC2 during palletizing. Energization of the relay EE opens contacts EE1' and EE2', thus preventing completion of these energizing circuits during depalletizing. However, the suction valve open solenoid 340 will be operated to apply suction to the suction head 63 through normally open contacts EE12 and normally open contacts VC2, while the suction valve closed solenoid 340' and the vent valve solenoid 340'' will be energized through normally open contacts EE13 and normally open contacts VO1. In other words, operation of the VC relay will, during depalletizing, operate the suction valve open solenoid 340 rather than the suction valve closed solenoid 340'. Similarly, the relay VO will operate the suction valve closed solenoid 340' during depalletizing rather than the suction valve open solenoid 340. Hence, the sequence of operations of the two suction valve solenoids will be exactly reversed so that the suction head will receive suction to pick up a load when the down limit switch 210 is operated over a pallet, and will have suction removed therefrom when the down limit switch is operated over the loading table 280 to deposit the load thereon. It should be observed that the relay VV will be operated whenever a load is held by the suction head to prevent accidental de-energization of the blower motor 182 and hence dropping of the load. The operation of relay O to control cycling to the right and to the left will proceed in the same manner as described in connection with the palletizing operation.

In the first depalletizing cycle, relay C is operated to eliminate initial descent of the suction head to the table 280 so that the first operation is lateral travel of the suction head. It will be recalled that operation of relay C dropped out relay D', thus preventing the downward suction head travel. On succeeding depalletizing cycles, relay C cannot pick up at the beginning of a cycle because of the opening of contacts EE10 upon operation of relay EE. Hence for all depalletizing cycles except the first, relay C does not operate until relay VO picks up in response to operation of the down limit switch 210 when the suction head deposits a tier of cartons on the table 280. It should be observed that even though relay C operates upon operation of the down limit switch 210, relay F' will not operate until upper limit switch contacts UL1 are closed, so that the trolley motor will not start before the suction head arrives at the top of its travel. Similarly, relay G will not operate until relay F' operates so that operation of relay KK must await operation of the upper limit switch UL. Hence, the motors 291 and 286 will not operate to carry the tier of cartons toward the rear of the table 280 until the suction head reaches the top of its travel.

It should be observed that a change over from depalletizing to palletizing or vice versa can conveniently be made. Assuming that the machine has been depalletizing and has completed a cycle with the suction head in a center raised position and carrying a load, the relay EE will be energized. If the operator reverses the switch PD from depalletizing to palletizing, the relay EE will remain energized, although the energizing circuit therefore will include normally closed contacts VO10, normally closed contacts F'10 and normally open contacts EE14, rather than the depalletizing contact of switch PD. By virtue of the change from palletizing to depalletizing of the switch PD, the trolley motor will be energized to carry the trolley toward the left or toward the right depending upon the previous condition of relay O. As the trolley starts traveling, the relay EE will be deenergized by the normally closed contacts F'10 opening, and will thereafter remain dropped out throughout the succeeding palletizing operations. If the suction head had been in a center raised position but without a load, the change from depalletizing to palletizing will cause the suction valve closed solenoid 340' to energize through a palletizing contact of switch PD, normally closed contacts VV10, normally open contacts EE15, and conductor 304 to ground. The suction head will then start down and proceed through a palletizing cycle as described above. When the down motion of the suction head stops and relay VO becomes energized, relay EE will drop out by the opening of normally closed contacts VO10, and will remain de-energized throughout the succeeding palletizing operations.

When the suction head descends toward the table 280 during the depalletizing operation, it deposits a tier of cartons thereon, the tier, in the example selected, having three row of cartons. The release of the tier is effected, as described above, by energization of suction valve closed solenoid 340' upon operation of the down limit switch 210 and the relay VO. The suction head will then raise preparatory to commencement of another pick-up cycle from the pallet being unloaded, or, in case this pallet has been completely unloaded, as indicated by complete operation of the switch TC11, from the pallet located adjacent the other side of the table 280. Energization of the relay VO in response to closing of down limit switch contacts DL3 causes contacts VO2 thereof to close, thereby completing the energizing circuit for relay C. Operation of relay C in turn operates relay F' to set up a trolley motor starting circuit. Operation of relay F' also operates relay G by the closing of contacts F'2, and relay G locks up through contacts G2 thereof. Operation of relay G in turn operates relay KK through contacts G10, thereby starting the loading table live roller motor 291 and the chain motor 286 in a direction such as to carry cartons toward the rear of the table 280. The first row of cartons to be picked up by the chains 283 will be carried away from the succeeding rows since the chains 283 operate at a higher speed than the rollers 287.

Referring to Fig. 4, it will be noted that there are provided light sources 350 and 351 directing beams of light at photocells 352 and 353, respectively. The light beams from the sources 350 and 351 are arranged to be interrupted by cartons advancing toward the rear of the table 280. Interruption of the light source impinging on the photocell 352 operates a switch PH3, while interruption of the light beam impinging on the photocell 353 operates a switch PH4. As soon as the first row of cartons advancing on the chains 283 interrupts either or both of the light beams directed at the photocells 352 and 353, a stop bar solenoid SBS (Fig. 20) will be energized to operate the air cylinder 297' to raise the stop bar 297 into the path of advance of the succeeding rows of cartons to hold back the same. The energizing circuit for the stop bar solenoid SBS extends from conductor 326 through the solenoid SBS, normally open contacts PH3" or PH4" of switches PH3 and PH4, respectively, a depalletizing contact of switch PD, and conductor 304 to ground. The solenoid SBS is arranged to operate the air cylinder 297' to raise the stop bar 297. Of course, any other convenient stop bar actuating mechanism could be employed.

The first row of cartons will continue advancing toward the rear of the table 280 until it reaches the end thereof and operates switches DS3, DS4 and DS5 located adjacent the rear wall of the table 280 and in the path of carton advance. Operation of normally open contacts DS3', DS4' and DS5' of switches DS3, DS4 and DS5, respectively, will complete an energizing circuit for relay MM (Fig. 20) extending from conductor 326 through the coil of relay MM, contacts DS5', DS4' and DS3', a depalletizing contact of switch PD, and conductor 304 to ground. Operation of relay MM will de-energize solenoids TSV and TSV' (Fig. 20), which are arranged to operate the table tilting air cylinder or cylinders such as the cylinder 128 of Fig. 10. Release of the solenoids TSV and TSV' will allow the tilting portions of the table 280 to rock downwardly, whereby the bottoms of the cartons will be engaged by the rollers 281 to carry the same toward the discharge conveyor section 295. The solenoids TSV and TSV' will have previously been energized on pick-up of relay EE through a circuit extending from the conductor 326 through parallel connected solenoids TSV and TSV', normally open contacts EE16, an automatic contact of switch MO, a normally closed contact MM1, a depalletizing contact of switch PD, and conductor 304 to ground. Cartons reaching the conveyor section 295 will be spaced from following cartons by the higher speed operation of the conveyor section 295. Furthermore, cartons which require turning to achieve the desired end-to-end relationship will be engaged by the shoulder 296 and turned by engagement with the latter, as shown in Fig. 4.

As the last carton of the first row leaves the table 280, the light beams to both photocells 352 and 353 will have been re-established, thereby releasing switches PH3 and PH4, and in turn opening contacts PH3" and PH4", whereby the solenoid SBS will be released. Release of solenoid SBS causes the stop bar 297 to withdraw from the path of carton advance, and permits the next row of cartons to move toward the rear of the table 280. Opening of contacts PH3' and PH4' will also open a locking circuit for relay MM which had extended from the conductor 326 through the coil of relay MM, normally open contacts MM2, and the parallel normally open contacts PH3" and PH4". Release of relay MM will close the contacts MM1 thereof, thereby energizing the solenoid TSV' and causing the tilting portions of the table 280 to tilt upwardly, thus permitting the cartons to advance over the rollers 281. As soon as the second row of cartons interrupts one or both of the light beams to the photocells 352 and 353, the relay MM will again operate, thereby releasing the solenoid TSV' to rock the table downwardly and operate the stop bar solenoid SBS to hold up advance of the third and final row of cartons.

It will be observed that the relay A energizing circuit on depalletizing includes contacts PH4' and PH3' of the switches PH4 and PH3, contacts TD2 of the time delay switch TD, and also contacts LL2 of slow to operate relay LL. Accordingly, the relay A cannot operate while cartons are interrupting one or both of the light beams which operate the switches PH3 and PH4 or while a blocking occurs on the depalletizing conveyor. Therefore, a new pick-up cycle cannot commence until the table 280 is cleared of cartons and unless the discharge conveyor is free to carry away the next tier. Furthermore, the operating time of relay LL must elapse before contacts LL2 close to energize relay A. This time, which is preferably about 5 seconds, prevents operation of relay A between discharge of the first row and advance of the second row and between discharge of the second row and advance of the third, the light beams which operate the switches PH3 and PH4 being broken almost immediately after the stop bar releases a row of cartons and the light beam which operates the switch PH4 not being restored until the last carton of the row is off the table 280. The 5 second time delay provides an adequate safety factor so that the suction head will not come down until the table is clear. The new cycle referred to is initiated by downward movement of the loaded suction head toward the table 280.

As pointed out above, a predetermined time interval, such as about 5 seconds, after the relay MM has operated in response to clearing of the table 280 of cartons, slow to operate relay LL will pick up through a circuit extending from conductor 326 through the coil of relay LL, a depalletizing contact of switch PD, an automatic contact of switch MO, normally closed contacts MM1, a depalletizing contact of switch PD, and conductor 304 to ground. Operation of relay LL will complete the energizing circuit for the relay A extending from conductor 327 through the coil of relay A, a depalletizing contact of switch PD, normally closed contacts PH4', PH3' and TD2, an automatic contact of switch MO, normally open contacts O10 and EPB1 or normally closed contacts O9 and contacts EPA1, and normally open contacts LPB1 or LPA1, to depalletizing contacts of the switch PD, normally open contacts LL2, normally closed contacts M2 and conductor 328 to ground. Operation of the relay A triggers off a succeeding depalletizing cycle commencing with descent of the loaded suction head toward the table 280. While cartons of the previous cycle were being moved off the table 280, the suction head had been carried to a loaded pallet to bring back a tier of cartons. Upon arrival of the loaded suction head at the top center position, the suction head remains in place until relay A is operated to start the next cycle.

The automatic control circuit described above can be used to operate the arrangement of Fig. 1 with a few modifications. Principally, the arm 44 should be replaced with a solenoid operated turning pin as shown at 279 of Fig. 4. The motors 32' and 79', operating the conveyor sections 32 and 79, respectively, should be connected in the same manner as the motors 275' and 275D of Fig. 4. The motors 278, 281A and 295' of Fig. 4, which are designated IDM in Fig. 18, should be replaced by the motors 37, 40 and 77 of Fig. 1. The motors 286 and 291 of Fig. 4 should be replaced with motors 101 and 110 of Fig. 1. It will be observed that the various switches and photocells shown in Figs. 4, 5 and 6 are also illustrated in Figs. 1, 2 and 3.

The circuit described above for palletizing and depalletizing is fully automatic in operation. Occasionally, it may be desirable to provide operation on a semi-automatic basis in which an operator initiates certain control functions. In the embodiment of the invention illustrated in Figs. 18–26, semi-automatic palletizing is provided with two manual control functions. The semi-automatic depalletizing operation illustrated involves only a single manual operation.

Figure 20:
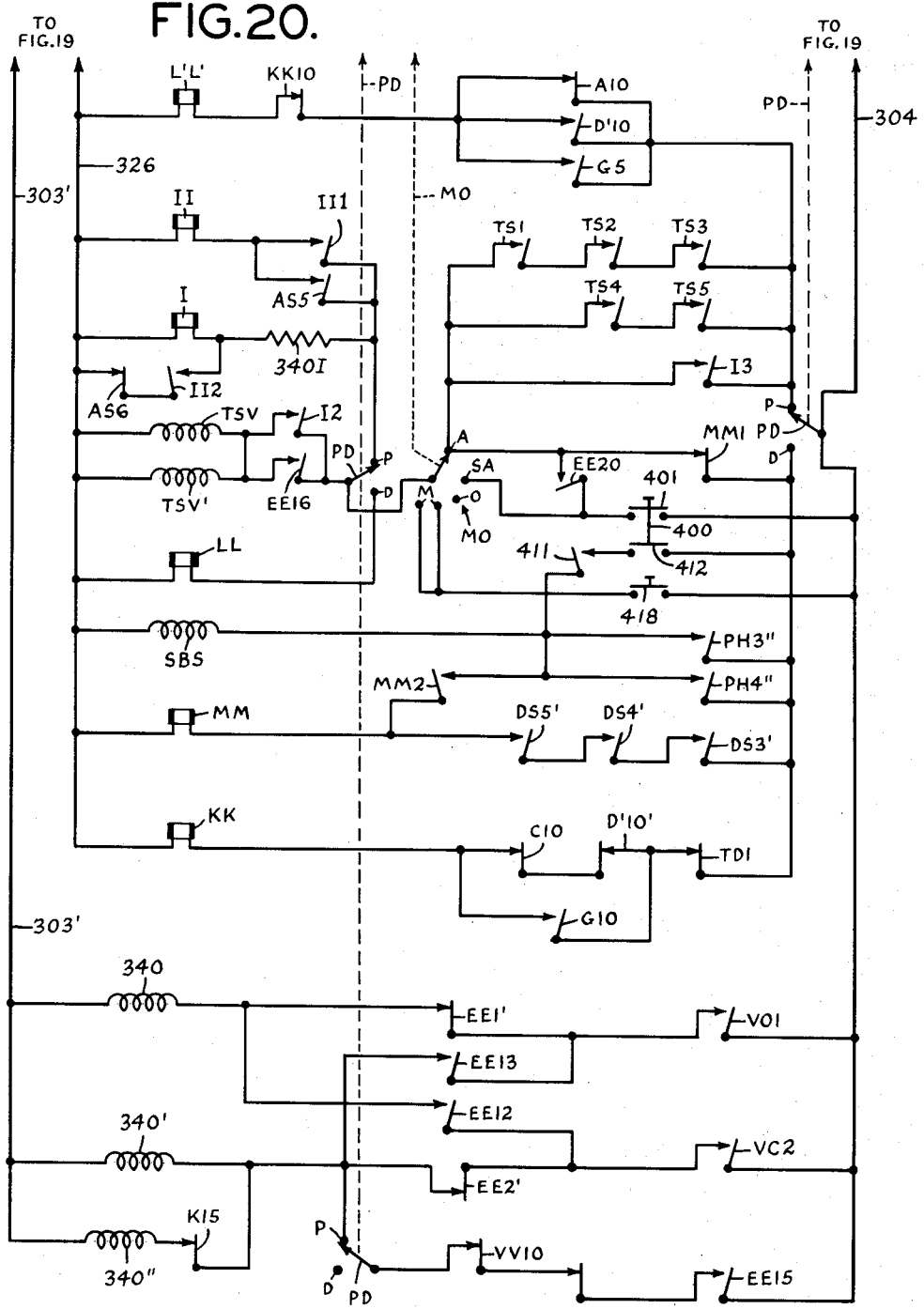

Considering first semi-automatic palletizing, the ganged switch MO should be placed in the semi-automatic position SA, the ganged switch PD should be placed in the P position, the ganged switch TS should be placed in the position corresponding to the number of tiers which it is desired to count, and the switch PS should be placed in the position corresponding to the number of cartons per tier. Closing of the main switch MC will apply power to the circuit and will operate the various conveyor motors as described in connection with automatic operation. When the number of cartons desired for a complete rank in a tier are present on the rear of the loading table, either the loading table 280 of Fig. 4 or the table 47 of Fig. 1, the operator closes a switch designated 400 (Fig. 20). The switch 400 might be a foot switch, a knee switch or other suitably operated switching mechanism. It is a double-pole, single-throw switch, which remains closed only when held closed by the operator. When the switch 400 is closed, the armature 401 thereof will complete an energizing circuit for the tilt solenoid TSV, the normally open contacts I2 having previously been closed through the circuit provided for automatic operation and the switch MO being in the semi-automatic position thereof. Energization of the solenoid TSV will result in the tilting of the tiltable portions of the loading table to advance the rank of cartons toward the front of the loading table.

As soon as a full tier of cartons has been formed on the pick-up area of the loading table, the operator should operate a push button double-pole, double-throw switch 402 (Fig. 21) which will initiate the suction head operating cycle. The armature 403 of the switch 402 completes an energizing circuit for the cycling relay A extending from the conductor 327 through the coil of relay A, a contact P of switch PD, a contact SA of switch MO, the armature 403 of switch 402, and conductor 328 to ground. The suction head will then descend, engage a tier of cartons, rise to its upper center position and then proceed to palletize to the left or to the right depending upon the condition of relay O as described in connection with automatic operation. Since the relay O will be de-energized at the start of operations, the first pallet loaded will normally be the left-hand or A pallet in Figs. 1 and 4.

When the desired number of tiers has been loaded on the left-hand pallet, relay O should be energized so that the succeeding tiers will be loaded on the right-hand pallet. To energize relay O, a circuit is provided extending from the conductor 303, through the coil of relay O, a contact SA of switch MO, a conductor 404, the bottom armature 405 of the switch 402, a conductor 406, the normally open contacts Q3 and the normally closed contacts P4 and conductor 306 to ground. When energized, relay O locks up through normally open contacts O20 and normally closed contacts M2. It will be evident that relay O will drop out during semi-automatic operation each time the end of cycle relay M operates. However, relay O will tend to pick up again each time the push button switch 402 is opened so that palletizing will occur in the desired direction as determined by the condition of the relay Q.

If desired, a triple-pole, double-throw switch 407 (Fig. 21) may be employed to initiate the head operation. The switch 407, which, like the switch 402, is a momentary switch, will, in the upper position thereof in Fig. 21, energize the relay A through a circuit extending from conductor 327, through the coil of relay A, a P contact of switch PD, at an SA contact of switch MO, the center armature 408 of the switch 407, the right-hand armature 409 of the switch 407 and conductor 328 to ground. In this upper position of the switch 407, relay O will not be energized so that palletizing will take place toward the left or A position in Fig. 4. In the other or down position of the switch 407, the relay A will be energized through the armatures 408 and 409, as before, but the relay O will be energized through connection of the conductor 406 to the conductor 328 through the armature 410 of the switch 407. As before, the relay O will lock up through contacts O20 and M2. Normally closed contacts C25 of relay C are inserted in the conductor 406 to insure proper operation even if the switch 407 is reversed during operation.

For semi-automatic depalletizing, the switch 407 or the push button 402 may be employed to control the cycle of suction head travel exactly as described above. However, the tilt solenoid valve TSV' is energized automatically as described in connection with automatic depalletizing so that the switch 400 need not be used in depalletizing. However, if the operator desires to control the stop bar solenoid SBS, a switch 411 (Fig. 20) may be closed so that the photoswitch contacts PH3" and PH4" will be shunted out by the switch 411 and the lower armature 412 of the switch 400. In this manner, operation of the switch 400 will cause the stop bar to rise into the path of cartons traveling toward the rear end of the table.

It may occasionally be found desirable to operate one portion of the circuit independently of the other portions thereof. For this purpose, the switch MO is provided with two manual positions each deisgnated M. In all cases except one, the M contacts of the gang switch MO are connected together or left blank. The exception is the MO switch contacts included in the energizing circuit of the relay O. One M contact of this MO switch is connected to the conductor 306 so that the relay O will be energized to provide palletizing or depalletizing toward the right or B positions of Fig. 1 or 4. The other M contact of this switch is blank so that the relay O will remain de-energized and permit operation in the other direction.

With the ganged switch MO in either of the manual positions thereof, various test switches may be operated to control specific circuit functions. These switches are preferably all of the momentary type so that they must be maintained in their operated positions by the operator during the corresponding operations. With the switch MO in an M position thereof, the relay GG (Fig. 19) will be energized through a circuit extending from conductor 303 through an M contact of switch MO, the coil of relay GG and conductor 304 to ground. Operation of relay GG will close contacts GG10 thereof, causing the relays E and J to pick up in the sequence described previously. Contacts GG11, included in the energizing circuit for the blower starter coil BLST, will close, thus starting the blower motor. A switch 413 (Fig. 19) is provided to permit energization of the coils IDM' and 275" so that the motors 275', 275D and IDM may be operated.

A double-pole, single-throw switch 414 (Fig. 23) is provided to selectively energize the turning pin solenoid 279'. The circuit for manual operation of the solenoid 279' extends from conductor 303 through conductor 327', a conductor 415, upper armature 416 of the switch 414, the coil 279', a lower armature 417 of the switch 414, and conductor 306 to ground. Operation of the switch 414 energizes the solenoid 279' and retracts the turning pin 279 to permit cartons to advance unturned toward the loading table.

A switch 418 (Fig. 20) is provided in the energizing circuit for the tilt table solenoids TSV and TSV' to permit operation of these coils. During palletizing the circuit will be made through the normally open contacts I2 while during depalletizing the circuit will be made through the normally open contacts EE16. A switch 419 (Fig. 21) is provided in the energizing circuit for the down pilot relay D' so that operation of the switch 419 will cause the suction head to move downwardly until the down limit switch contacts DLI open. A switch 420 (Fig. 22) included in the energizing circuit for the relay VO will permit suction to be applied during palletizing or to be removed during depalletizing. A companion switch 421 (Fig. 22) provides similar control over the relay VC.

A switch 422 (Fig. 22) is provided for energizing the relay U to cause the latter to raise the suction head. A switch 423 (Fig. 22) is provided for energizing the pilot relay F' so that the suction head will travel away from the center position toward the A or B position thereof depending upon the energized or de-energized condition of the relay O and hence, upon the setting of the switch MO. A switch 424 (Fig. 22) is provided for energizing the pilot relay R' whereby the suction head will be caused to travel toward the center position thereof from whichever side it happens to be located at.

A switch 425 (Fig. 19) is provided around the photo-switch contacts PH2' to permit correction of counting errors. The stop motion switch 325 (Fig. 19) cuts power to all motors when opened, but without disturbing the machine cycle.

The switch 312 (Fig. 26) included in the energizing circuits for the coils BCP and BCA is provided for subtracting a count from the switches BCA1 and BCP1. Opening the switch 312 will permit one or more cartons to pass the photocell 308' without registering a count on the switches BCA1 and BCP1. A normally open switch 426 (Fig. 26) is provided around the contacts PH1' to permit the addition of a count to the switches BCA1 and BCP1. This might be desirable, for example, if a damaged carton were removed from the conveyor or loading table after having been counted but before the tier is formed.

Alternating and direct current power for the circuit operation is derived from the power lines 300 and 302 through a transformer 450. The secondary winding of the transformer 450 is provided with two end connections 451 and 452 and a center tap 453. Similarly poled rectifiers 454 and 455 are provided in the conductors 451 and 452, respectively, to act as a full wave rectifier providing a desired D. C. potential, for example, 125 volts, between the conductor 453 and a conductor 456. The conductor 451 is connected to ground and provides the ground connection for the various A. C. circuits, while the conductor 453 serves as the high side of the A. C. line. The conductor 453 also serves as the positive D. C. line while the conductor 456 serves as the negative D. C. line. The use of alternating and direct current relays as described may be suitably varied to provide the most desirable arrangement under varying conditions. An additional pair of rectifiers 454' and 455' are provided to yield a higher D. C. voltage, such as 250 volts, for operating the photocells.

As will be observed from the drawings, various power connections are made so that certain portions of the circuit will not immediately receive power upon closing of the switch MC. For example, the conductors 303' (Fig. 19), 327 (Fig. 21) and 305 (Fig. 23) will not receive power until the relay J operates to close the contacts J3 thereof. The conductor 310 will not receive power unless the switch MO and the switch PD are in the respective A and P positions thereof. Accordingly, the box count for pattern and box count for aligning functions will not be operative except for fully automatic palletizing. On the other hand, the tier counting function will occur during all forms of operation.

It should be understood that the various alternating current motors illustrated could be replaced with direct current motors.

While the invention has been described in connection with specific embodiments thereof and in connection with specific uses, various modifications thereof will occur to those skilled in the art without departing from the spirit and scope of the invention as set forth in the appended claims. Various terms used in the specification and claims are intended to have a broad interpretation. For example, the term "table" should be understood as including various supporting structures or platforms suitable for use in accordance with the invention, and is not limited to the particular table-like structure illustrated. The invention has been described primarily with reference to cartons, although it will be understood that it is equally adapted to use with a variety of individual units suitable for stacking in superposed tiers.

In order to facilitate a clear and full understanding of the present invention and the operation of the same, the electrical control circuit shown in Figs. 18–26 has been described in detail herein. However, it is to be understood that the control circuit shown and described does not form a part of the present invention and is described and claimed in the application Serial No. 397,075 of William G. Pagdin entitled "Apparatus for Handling Materials."

What is claimed is:

1. Apparatus for loading a multiplicity of units onto a portable platform, comprising a table having an area thereof adapted to support successively a plurality of groups of said units, the units included in each group being in patterned relation forming a tier, means for forming successive tiers on said area, a hollow movable head having a depending flexible curtain adapted to encircle the units forming a tier and to engage in substantially air-tight manner the sides of the units forming the periphery of a tier, means to create a predetermined suction within said head whereby said curtain engages said units in said substantially air-tight manner, means for moving said head together with an engaged tier of units from said area to a position over said portable platform, and means to release the suction within said head whereby said engaged tier is deposited on said platform.

2. Apparatus for transferring a multiplicity of units between a portable platform and a table having an area thereof adapted to support successively a plurality of groups of said units, the units included in each group being in patterned relation forming a tier, comprising a hollow movable head having a depending flexible curtain adapted to encircle the units forming a tier and to engage in substantially air-tight manner the sides of the units forming the periphery of a tier, means to create a predetermined suction within said head whereby said curtain engages said units in said substantially air-tight manner, means for moving said head together with an engaged tier of units between said area and said portable platform, and means to release the suction within said head to release said engaged tier.

3. Apparatus for unloading a multiplicity of units from a portable platform and onto a discharge mechanism, comprising a table having an area thereof adapted to support successively a plurality of groups of said units, the units included in each group being in patterned relation forming a tier, means for removing successive tiers deposited on said area, means for delivering the deposited units in single file to said discharge mechanism, a hollow movable head having a depending flexible curtain adapted to encircle the units forming a tier and to engage in substantially air-tight manner the sides of the units forming the periphery of a tier, means to create a predetermined suction within said head whereby said curtain engages said units in said substantially air-tight manner, means for moving said head together with an engaged tier of units from a position over said portable platform to a position over said area, and means to release the suction within said head whereby said engaged tier is deposited on said area.

4. In apparatus for transferring a multiplicity of units in groups formed of individual units in predetermined patterned relation forming a tier, a hollow suction head for gripping and raising a tier comprising a rigid upper portion adapted to rest on the tops of the units forming a tier and a flexible apron depending from said upper portion adjacent to the periphery thereof and adapted to encircle the units forming a tier and to engage in substantially air-tight manner the sides of the units forming the periphery of a tier, said rigid upper portion having an aperture adapted to receive one end of a tube communicating at the other end thereof with a source of suction thereby to create a desired suction within said head whereby said apron engages said units in said substantially air-tight manner.

5. In apparatus for transferring a multiplicity of units in groups formed of individual units in predetermined patterned relation forming a tier, a hollow suction head for gripping and raising a tier comprising a rigid upper portion having a solid top member and a foraminated member spaced from and generally parallel to said top member and adapted to rest on the tops of the units forming a tier and a flexible apron depending from said upper portion adjacent to the periphery thereof and adapted to encircle the units forming a tier and to engage in substantially air-tight manner the sides of the units forming the periphery of a tier, said top member having an aperture adapted to receive one end of a tube communicating at the other end thereof with a source of suction thereby to create a desired suction within said head whereby said apron engages said unit in said substantially air-tight manner.

6. In apparatus for transferring a multiplicity of units in groups formed of individual units in predetermined patterned relation forming a tier, a hollow suction head for gripping and raising a tier comprising a rigid upper portion and a thin flexible curtain depending from said upper portion adjcent to the periphery thereof and adapted to encircle the units forming a tier and to engage in substantially air-tight manner the sides of the units forming the periphery of a tier, said rigid upper portion comprising a solid top member, an auxiliary member slidably carried by said solid top member for adjusting the effective area of said suction head and two foraminated members each carried by a respective one of said top member and said auxiliary member and spaced from said top and auxiliary members and being adapted to rest on the tops of the units forming a tier, said curtain being formed by a first portion depending from said top member and a second portion depending from said auxiliary member, said portions overlapping to a sufficient extent that said curtain completely encircles the units forming a tier irrespective of the disposition of said auxiliary member relative to said top member, said top member having an aperture adapted to receive one end of a tube communicating at the other end thereof with a source of suction thereby to create a desired suction within said head whereby said curtain engages said units in said substantially air-tight manner.

7. In apparatus for transferring a multiplicity of units in groups formed of individual units in predetermined patterned relation forming a tier, a hollow suction head for gripping and transferring a tier comprising a rigid upper portion having a solid top member and spacing means located below said top member and adapted to contact the tops of the units forming a tier, said spacing means having openings therein for the free passage of air therethrough, and a flexible apron depending from said upper portion adjacent to the periphery thereof and adapted to encircle the units forming a tier and to engage in substantially air-tight manner the sides of the units forming the periphery of a tier, said top member having an aperture for communication with a source of suction thereby to create a desired suction within said head whereby said apron engages said units in said substantially air-tight manner.

8. In apparatus for transferring a multiplicity of units in groups formed of individual units in predetermined patterned relation forming a tier, a hollow suction head for gripping and transferring a tier comprising a rigid upper portion having a solid top member and a flexible skirt-like member depending from said upper portion adjacent to the periphery thereof and adapted to encircle the units forming a tier and to engage in substantially air-tight manner the sides of the units forming the periphery of a tier, said top member having an aperture for communication with a source of suction thereby to create a desired suction within said head whereby said flexible skirt-like member engages said units in said substantially air-tight manner.

References Cited in the file of this patent

UNITED STATES PATENTS

| | | |
|---|---|---|
| 711,947 | Dittbenner | Oct. 28, 1902 |
| 1,545,031 | Beugler | July 7, 1925 |
| 2,557,260 | Clark | June 19, 1951 |
| 2,598,222 | Cahners et al. | May 27, 1952 |
| 2,633,251 | Bruce | Mar. 31, 1953 |
| 2,637,587 | Robinson | May 5, 1953 |